(12) United States Patent
Hart et al.

(10) Patent No.: US 7,821,915 B2
(45) Date of Patent: *Oct. 26, 2010

(54) CHANNEL TRACKING IN AN OFDM WIRELESS RECEIVER

(75) Inventors: Brian Hart, Wollstonecraft (AU); David J. Pignatelli, Saratoga, CA (US); Eldad Perahia, Sunnyvale, CA (US); Paul C. P. Dankoski, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/130,368

(22) Filed: May 30, 2008

(65) Prior Publication Data

US 2008/0232497 A1    Sep. 25, 2008

Related U.S. Application Data

(63) Continuation of application No. 10/807,547, filed on Mar. 22, 2004, now Pat. No. 7,397,758, which is a continuation-in-part of application No. 10/217,117, filed on Aug. 12, 2002, now Pat. No. 7,161,896.

(51) Int. Cl.
*H04J 11/00* (2006.01)
(52) U.S. Cl. .................. 370/208; 370/209; 370/210; 375/235
(58) Field of Classification Search .......... 370/208, 370/209, 210, 480; 375/235
See application file for complete search history.

(56) References Cited

U.S. PATENT DOCUMENTS

| | | | |
|---|---|---|---|
| 5,912,876 A | 6/1999 | H'mimy | 370/210 |
| 5,953,311 A | 9/1999 | Davies et al. | 370/210 |
| 5,963,592 A | 10/1999 | Kim | 375/232 |
| 5,973,642 A | 10/1999 | Li et al. | 342/378 |
| 6,021,110 A * | 2/2000 | McGibney | 370/208 |

(Continued)

OTHER PUBLICATIONS

Ove Edfors, Magnus Sandell, Jan-Jaap van de Beek, Sarah Kate Wilson and Per Ola Borjesson. "Analysis of DFT-Based Channel Estimators for OFDM." *Wireless Personal Communications*, vol. 12, Issue 1, pp. 55-70, Jan. 2000.

(Continued)

*Primary Examiner*—William Trost, IV
*Assistant Examiner*—Kyle C Kasparek
(74) *Attorney, Agent, or Firm*—Dov Rosenfeld; Inventek

(57) ABSTRACT

An apparatus and a method to track the channel response for subcarriers in an OFDM receiver for a packet of information that includes a known transmitted part. The receiver has a signal-to-tone transformer to determine subcarriers corresponding to a received packet. The method stores a function of an initial estimate of the channel response for a subcarrier, and accepts a pre-decision constellation point value that is a post channel correction using a first estimate of the channel response. The method includes: makes a decision using the pre-decision constellation point value, re-modulates the decision to form a post-decision constellation point value, and forms a complex valued product of the function of the first estimate for the subcarrier and the complex-valued ratio of the pre-decision and post-decision values. This complex valued product forms a measure of the current channel estimate to use for updating the stored quantity.

20 Claims, 9 Drawing Sheets

U.S. PATENT DOCUMENTS

| | | | | |
|---|---|---|---|---|
| 6,141,393 | A | 10/2000 | Thomas et al. | 375/347 |
| 6,298,035 | B1 | 10/2001 | Heiskala | 370/206 |
| 6,327,314 | B1 | 12/2001 | Cimini, Jr. et al. | 375/340 |
| 6,442,129 | B1 | 8/2002 | Yonge, III et al. | 370/204 |
| 6,445,342 | B1 | 9/2002 | Thomas et al. | 342/367 |
| 6,473,393 | B1 | 10/2002 | Ariyavisitakul et al. | 370/203 |
| 6,477,210 | B2 | 11/2002 | Chuang et al. | 375/340 |
| 6,487,253 | B1 | 11/2002 | Jones, IV et al. | 375/260 |
| 6,496,535 | B2 | 12/2002 | Xu | 375/219 |
| 6,608,863 | B1 * | 8/2003 | Onizawa et al. | 375/232 |
| 6,650,617 | B1 * | 11/2003 | Belotserkovsky et al. | 370/210 |
| 6,876,645 | B1 | 4/2005 | Guey et al. | 370/342 |
| 7,023,931 | B2 * | 4/2006 | Magee et al. | 375/262 |
| 7,031,250 | B2 | 4/2006 | Vandenameele-Lepla | 370/206 |
| 7,161,987 | B2 | 1/2007 | Webster et al. | 375/260 |
| 7,397,758 | B1 * | 7/2008 | Hart et al. | 370/208 |
| 2002/0065047 | A1 * | 5/2002 | Moose | 455/63 |
| 2002/0131516 | A1 | 9/2002 | El-Gamal et al. | 375/285 |

OTHER PUBLICATIONS

Ye (Geoffrey) Li, Leonard J. Cimini, Jr., and Nelson R. Sollenberger. "Robust Channel Estimation for OFDM Systems with Rapid Dispersive Fading Channels." *IEEE Transactions on Communications*, vol. 46, No. 7,pp. 902-915, Jul. 1998.

Vittoria Mignone and Alberto Morello. "CD3-OFDM: A Novel Demodulation Scheme for Fixed and Mobile Receivers." *IEEE Transactions on Communications*, vol. 44, No. 9,pp. 1144-1151, Sep. 1996.

Ye (Geoffrey) Li. "Simplified Channel Estimation for OFDM Systems with Multiple Transmit Antennas." *IEEE Transactions on Wireless Communications*, vol. 1, No. 1, pp. 67-75, Jan. 2002.

Juha Heiskala and John Terry. *OFDM Wireless LANs: A Theoretical and Practical Guide* (ISBN: 0672321572) Publisher: Sams Publishing, 2002. Chapter 2, p. 81: "Enhancing the Channel Estimate", and Chapter 2, p. 84: bibliography for Chapter 2.

Alexandre Ribeiro Dias, Stephanie Roquette and Karine Gosse. "MTMR Channel Estimation and Pilot Design in the Context of Space-Time Block Coded OFDM-Based WLANs." Centre de Recherche de Motorola, Paris. Available online at http://www.telecom.ntua.gr/fitness/dissemination/MOT-mtmr_channel_estimation_wlan.pdf.

Erik G. Larsson, Guoqing Liu, Jian Li, and Georgios B. Giannakis. "Joint Symbol Timing and Channel Estimation for OFDM Based WLANs." *IEEE Communications Letters*, vol. 5, No. 8, pp. 325-327, Aug. 2001.

Hui Liu and Ufuk Tureli. "A High Efficiency Carrier Estimator for OFDM Communications." *IEEE Communications Letters*, vol. 2, No. 4,pp. 104-106, Apr. 1998.

J. Stott. "The Effects of Phase Noise in COFDM." *EBU Technical Review*, pp. 1-22, Summer 1998.

Jan-Jaap van de Beek, Ove Edfors, Per Ola Borjesson, Mattias Wahlqvist and Christer Ostberg. "Channel Estimation in the Uplink of an OFDM System." *NRS Symposium*, pp. 32-35, Lund, Sweden, Aug. 1996.

SeongHo Ha, Inho Hwang and HwangSoo Lee. "A Decision-Directed Frame Synchronization Algorithm for OFDM Systems." *IEICE Trans. Communication*, vol. E83-B, No. 7, pp. 1563-1566, Jul. 2000.

Thomas Keller, Lorenzo Piazzo, Paolo Mandarini and Lajos Hanzo. "Orthogonal Frequency Division Multiplex Synchronization Techniques for Frequency-Selective Fading Channels." *IEEE Journal on Selected Areas in Communications*, vol. 19, No. 6, pp. 999-1008, Jun. 2001.

I. Barhumi and M. Moonen. "Pilot Tone-based Channel Estimation for ODFM Systems with Transmitter Diversity in Mobile Wireless Channels." from *Proceedings of the program for research on integrated systems and circuits* (ProRISC), Veldhoven, The Netherlands, pp. 270-275, Nov. 2001.

Nils Sundstrom, Ove Edfors, Per Odling, Hakan Eriksson, Timo Koski and Per Ola Borjesson. "Combined Linear-Viterbi Equalizers—A Comparitive Study and A Minimax Design." *IEEE Vehicular Technology Conference*, pp. 1263-1267, Stockholm, Sweden, Jun. 1994.

J H Stott. "Explaining Some of the Magic of the COFDM." From *Proceedings of 20th International Television Symposium 1997*, Montreux, Switzerland, Jun. 13-17, 1997. Available online at http://www.bbc.co.uk/rd/pubs/papers/paper_15/paper_15.html.

Ufuk Tureli, Hui Liu and Michael Zoltowski. "OFDM Blind Carrier Offset Estimation: ESPRIT." *IEEE Transactions on Communications*, vol. 48, No. 9, Sep. 2000.

Jan-Jaap van de Beek, Ove Edfors, Magnus Sandell, Sarah Kate Wilson and Per Ola Borjesson. "On Channel Estimation in OFDM Systems." Division of Signal Processing Lule University of Technology, Sweden & Purdue University School of Electrical Engineering USA, Proceedings at IEEE VTC 95, Chicago, 1995. Available online at http://www.sm.luth.se/csee/sp/research/conference/On_Channel_Est_in_OFDM_Syst.pdf.

M. Julia Fernandez-Getino Garcia, Ove Edfors and Jose M. Paez-Borallo. "Joint 2D-Pilot-Symbol-Assisted-Modulation and Decision-Directed Frequency Synchronization Schemes For Coherent OFDM." Proc. ICASSP'2000, vol. 5, pp. 2961-2964. Istanbul, Turkey, Jun. 2000.

Ye (Geoffrey) Li. "Simplified Channel Estimation for OFDM Systems With Multiple Transmit Antennas." *IEEE Transactions on Wireless Communications*, vol. 1, No. 1, pp. 67-75, Jan. 2002.

Michele Morelli and Umberto Mengali. "A Comparison of Pilot-Aided Channel Estimation Methods for OFDM Systems." *IEEE Transactions on Signal Processing*, vol. 49, No. 12, pp. 3065-3073, Dec. 2001.

B. Muquet, M. de Courville, G.B. Giannakis, Z. Wang and P. Duhamel. "Reduced Complexity Equalizers for Zero-Padded OFDM Transmissions." Intl. Conf. on Acoustics, Speech and Signal Processing , Jun. 2000, Istanbul, Turkey. Available online at http://clue.eng.iastate.edu/~zhengdao/publications/papers/mcgw00.pdf.

Ove Edfors, Magnus Sandell, Jan-Jaap van de Beek, Daniel Landstrom and Frank Sjoberg. "An Introduction to Orthogonal Frequency-Division Multiplexing." Research Report TULEA 1996:16, Div. of Signal Processing, Luleå University of Technology, Luleå, Sep. 1996.

Takeshi Onizawa, Masato Mizoguchi and Masahiro Morikura. "A Novel Channel Estimation Scheme Employing Adaptive Selection of Frequency-Domain Filters for OFDM Systems." *IEICE Trans. Comm.*, vol. E82-B, No. 12, pp. 1923-1930, Dec. 1999.

Magnus Sandell and Ove Edfors. "A Comparative Study of Pilot-Based Channel Estimators for Wireless OFDM." Div. Signal Processing, Luleå Univ. Technol., Luleå, Sweden, Res. Rep. TULEA 1996: Sep. 19, 2996.

Erik Lindskog and Claes Tidestav. "Reduced Rank Channel Estimation." *IEEE Vehicular Technology Conference*, Houston, TX, May 16-20, 1999, pp. 1126-1130.

Heiko Schmidt, Volker Kuhn and Karl-Dirk Kammeyer. "Channel Tracking in Wireless OFDM Systems." The $5^{th}$ World Multi-Conference on Systemics, Cybernetics and Informatics, SCI 2001, Jul. 22-25, 2001, Orlando, Florida USA. Available online at http://www.ant.uni-bremen.de/whomes/schmidt/papers/sci2001.pdf.

Ove Edfors, Magnus Sandell, Jan-Jaap van de Beek, Sarah Kate Wilson and Per Ola Borjesson. "OFDM Channel Estimation by Singular Value Decomposition." *IEEE Trans. Commun.*, vol. 46, pp. 931-939, Jul. 1998.

* cited by examiner

CHANNEL TRACKING IN AN OFDM WIRELESS RECEIVER

RELATED PATENT APPLICATIONS

The present application is a continuation of U.S. patent application Ser. No. 10/807,547 filed Mar. 22, 2004 now U.S. Pat. No. 7,397,758 to inventors Hart et al. U.S. patent application Ser. No. 10/807,547 is a continuation-in-part of U.S. patent application Ser. No. 10/217,117 filed Aug. 12, 2002 to inventors Hart et al., now U.S. Pat. No. 7,161,896. The contents of each of U.S. patent application Ser. Nos. 10/807,547 and 10/217,117 (now U.S. Pat. No. 7,161,896) are incorporated herein by reference. The invention of U.S. patent application Ser. No. 10/217,117 (now U.S. Pat. No. 7,161,896) is called the Parent Patent Application herein.

BACKGROUND

This invention relates to wireless receiver, and in particular to channel estimation in a receiver for a wireless network such as a wireless local area network (WLAN).

Wireless transmissions such as wireless data transmissions in a wireless network are distorted in transit by the radio channel, i.e., distorted versions of the transmitted signals are typically received at a wireless receiver. Equalization is a term that refers to the measures taken to reduce the distortion effects in a radio channel, and this typically requires estimating the channel or its inverse.

Orthogonal Frequency Division Multiplexing (OFDM) is increasingly being used in wireless networks. The IEEE 802.11 WLAN standard, for example, includes the 802.11a and the 802.11g variants that use OFDM. In a wireless receiving station that uses OFDM, channel estimation is used to determine the relative channel responses of the different subcarriers and to correct for variation in such channels. Channel estimation is also used to provide information on the quality of the channels that can be used in demodulating and decoding—such information commonly referred to as channel state information or CSI.

The OFDM variants of the IEEE 802.11 standard use data packets that each include a preamble that provides for channel estimation in a receiver. In particular, two known "long" symbols are used. Prior art channel estimation techniques include averaging the two estimates of the channel obtained from the two long symbols. Noise and other factors reduce the quality of this channel estimate, and such quality reduction lowers the quality of subsequent communication, e.g., the bit error rate (BER) and/or the packet error rate (PER).

Thus there is a need for improved estimation. Furthermore, the channel may change during the time that a packet is being received, i.e., within a packet.

Thus there is a further need for improved channel estimation by tracking changes during a packet.

The research literature includes many papers on channel estimation and channel tracking. See for example, H. Schmidt, V. Kühn, K. D. Kammeyer, R. Rückriem, and S. Fechtel: "Channel Tracking in Wireless OFDM Systems," CSI 2001, Orlando, Fla., USA, 22-25 Jul. 2001. The techniques described are typically computationally complex, e.g., involving optimization computations.

Thus, there is still a need for a practical relatively simple method that works well, yet that lends itself to inexpensive low power implementation in a chip.

Above-referenced and incorporated-by-reference U.S. patent application Ser. No. 10/217,117 (the Parent Patent Application, now U.S. Pat. No. 7,161,896) describes a practical method that improves the quality of the channel estimates using the possibility that there may be correlation between the channels of the subcarriers.

However, there is still a need to provide for tracking of channel estimates. This is preferably carried out by a simple implementation that has low computational complexity and lends itself to simple low power implementation.

SUMMARY

Described herein is an apparatus and a method to estimate, and then to update the channel response for a set of subcarriers in an OFDM receiver to wirelessly receive a packet of information that includes a known transmitted part having known subcarrier values. The receiver including a signal-to-tone transformer, e.g., discrete Fourier transformer such as an FFT unit, to determine the subcarriers of a signal corresponding to a received packet. Also described herein is an apparatus and a method of updating channel estimates for a set of subcarriers in such an OFDM wireless receiver.

In one embodiment, the method includes, for each subcarrier in the set of subcarriers, storing a function of a first estimate of the channel response for the subcarrier, and accepting a pre-decision constellation point value for the subcarrier. The pre-decision constellation point value is channel corrected using the first estimate of the channel response.

The method further includes making a decision using the pre-decision constellation point value, re-modulating the decision to form a post-decision constellation point value, and forming a complex valued product of the function of the first estimate for the subcarrier and the complex-valued ratio of the pre-decision and post-decision values. This complex valued product forms the channel drift to use for updating the stored quantity. In one embodiment, method includes updating the stored function of the first estimate of the channel response with a weighted amount of the formed complex valued product.

In one version, the storing of the first function stores the channel response for the subcarrier multiplied by the known value of the subcarrier for the known part. In another version, the storing of a first function stores the first estimate of the channel response of the subcarrier, post factored by the known value of the subcarrier for the known part.

In one embodiment, the weighted amount is a weighted average of the first estimate and the formed complex valued product. In a particular version, the receiver includes a circuit that provides a measure of the signal quality of a field in the packet that is known to be modulated at a relatively low data rate. This is called the SIGNAL field. In one embodiment, the updating is a function of the signal quality of the SIGNAL field. For example, no updating is performed of the measure of the signal quality if not above a settable threshold.

One embodiment further includes updating the quantity stored for the subcarrier as more data is received by the receiver.

In one version, making the decision forms a hard demodulated decision, while in another version, the received data is encoded, and making the decision includes demodulating, decoding, re-coding and remodulating to form a re-coded-decoded decision.

Other aspects and features will be clear from the description, drawings, and the claims.

DETAILED DESCRIPTION

The invention describes a method and apparatus for channel estimation and tracking in a multicarrier radio receiver, in particular, a radio receiver that uses orthogonal frequency division modulation (OFDM). In a multicarrier radio transmitter, including an OFDM radio transmitter, a signal for transmission is split into a set of subcarriers (also called "tones"), and the tones multiplexed together and transmitted via the channel. At the receiving end, the received signal is split into its various subcarriers and processed, then combined to construct the received signal. An OFDM transmitter typically uses the inverse discrete Fourier transform (IDFT), typically implemented as an inverse Fast Fourier Transform (IFFT), to form the multiplexed set of subcarriers for transmission, and an OFDM receiver typically uses the forward discrete Fourier transform (DFT), typically implemented as a Fast Fourier Transform (FFT) to convert a received signal into the data transmitted by the subcarriers. Each of the subcarriers experiences a slightly different channel. One aspect of the invention is to carry out channel estimation in a radio receiver for receiving multicarrier signals by estimating the phase and amplitude response experienced by each of the subcarriers of a multicarrier signal. One aspect of the invention is to exploit any correlation that the channel response of one subcarrier has to the channel response of one or more of the adjacent subcarriers. In a channel that can be accurately modeled as an additive Gaussian noise channel, the channels for all the subcarriers are correlated. In a fading channel, there may be some correlation between the channel for one subcarrier and those for one or more of its adjacent subcarriers.

Figure 1:
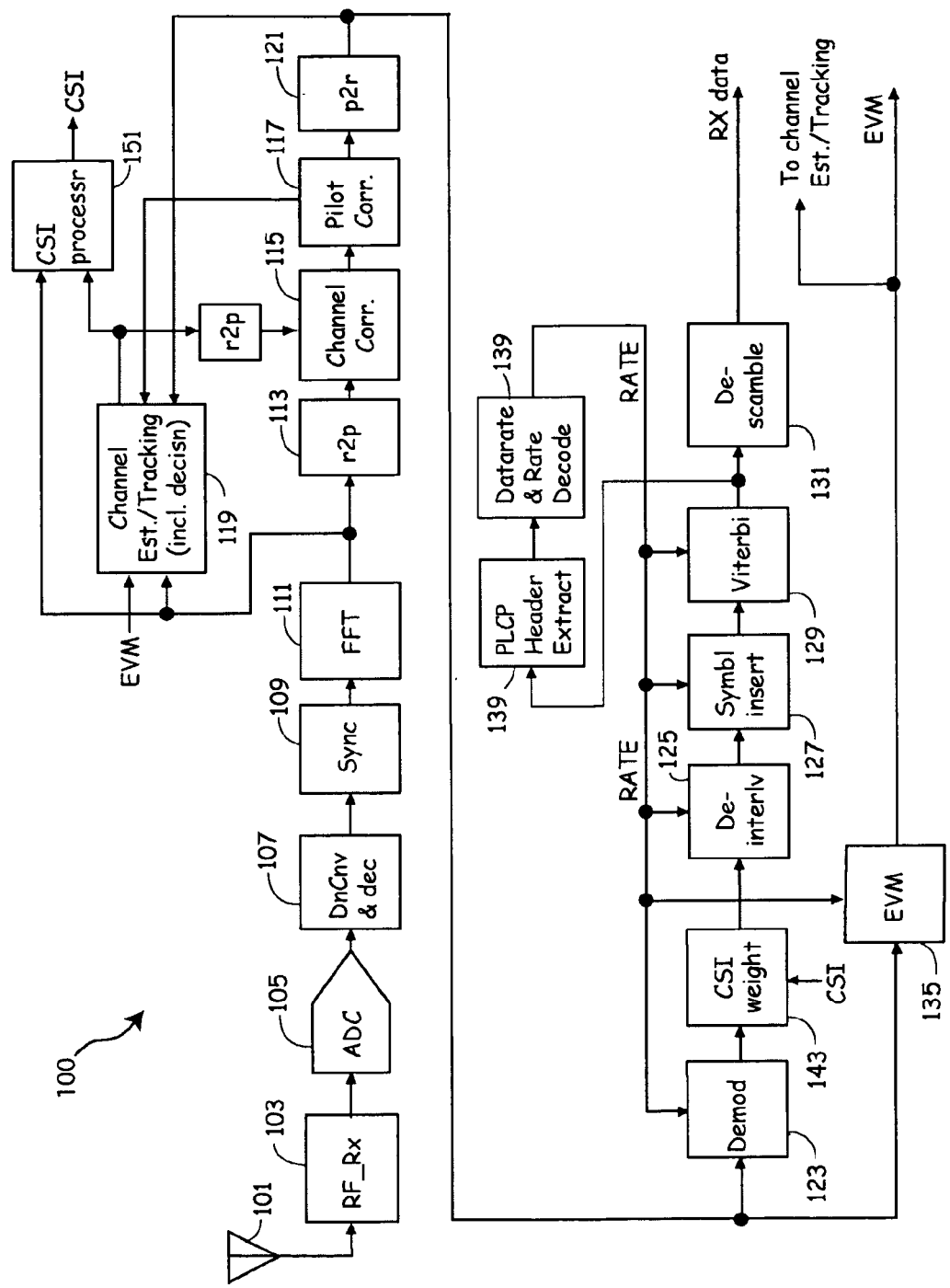
FIG. 1 shows a simplified block diagram of a OFDM receiver 100 that may be used for processing signals conforming to OFDM variants of the IEEE 802.11 standard and that includes an embodiment of the invention.

FIG. 1 shows a simplified block diagram of a OFDM receiver 100 that may be used for processing signals conforming to OFDM variants of the IEEE 802.11 standard and that includes an embodiment of the invention. The inventive channel estimator and tracker that determines the channel for each of the subcarriers is shown as block 119. The invention is however not restricted to using a channel estimator only in receiver architectures such as shown in FIG. 1.

Note that in order not to obscure the inventive aspects, some details are left out of FIG. 1, including the presence of one or more first-in-first-out buffers, I-Q to polar and polar-to-I-Q coordinate converters—e.g., Cordics—and so forth. Such elements are not related to the inventive aspects of the invention.

A receive antenna system 101 receives RF signals. A low noise amplifier combined with other RF components forms a receiver 103 that generates analog signals. Some embodiments of receiver 103 may produce baseband signals that require no further downconversion, while others may produce near-baseband IF signals that require further digital downconversion. The latter is assumed in this example. ADC 105 digitizes the signals. In one embodiment, block 107 further downconverts from the sampling frequency and decimates the signals to produce samples that enter a time synchronization unit 109. Synchronization is achieved by one or more methods such as estimating the short preamble's short symbol timing using a correlator and estimating the guard interval timing of the long preamble. The synchronization unit further includes frequency estimation and frequency correction using a rotator. The output of the rotator is presented to a 64-sample input buffer of a 64-sample discrete Fourier transformer 111 (DFT implemented as an FFT) for time-to-frequency conversion. The Fourier transformer 111 transforms the complex baseband time-domain samples of the received packet into complex frequency domain samples by a DFT operation. These complex frequency domain samples are the coded and modulated data of the subcarriers in the received OFDM signal.

The path from the receive antenna 101 to the Fourier transformer 111 thus forms a receive path to receive and digitize a transmitted OFDM data packet and form a set of subcarriers corresponding to the received data.

Figure 2:
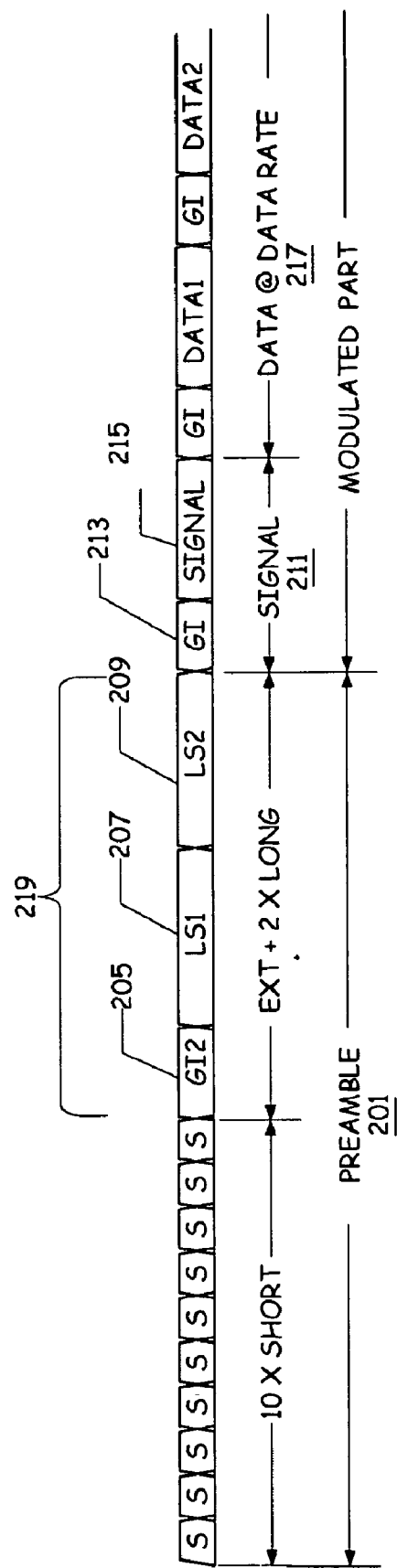
FIG. 2 shows the structure of an OFDM packet as used in IEEE 802.11a and 802.11g WLANs.

FIG. 2 shows the structure of an OFDM packet as used in IEEE 802.11a and 802.11g WLANs. The packet starts with a preamble 201 provided for start of packet (SOP) detection, automatic gain control (AGC), diversity selection when diversity is used, for various other synchronization functions, and for channel estimation. The preamble is followed by the modulated part, which starts with a known (low) data rate SIGNAL field 211 that provides information about the packet, followed by DATA fields at a rate specified in the signal field. Each data field includes a guard interval (cyclic extension).

The preamble 201 is 16 μs long and has two 8 μs parts: a first part ("short preamble part") consisting of set of 10 short symbols, and a second part ("long preamble part") 219 consisting of two long symbols 207 and 209, and a cyclic extension part (guard interval) 205. In a typical system, the short preamble part provides for SOP detection, AGC, diversity selection when diversity is used, coarse frequency offset estimation and timing synchronization. The long preamble part then provides for timing synchronization, channel estimation, and fine frequency offset estimation. Each long symbol 207 and 209 consists of 64 samples. The guard interval 205 consists of a 32 bit cyclic extension of the 64 samples.

The remainder of the packet is the modulated part that starts with a field 211, called SIGNAL, that has a SIGNAL data part 215 and a guard interval 213, and that is encoded with information such as the data rate of how the rest of the modulated part 217 is modulated and encoded.

Embodiments of the present invention use the two long symbols 207 and 209 to perform channel estimation, and the modulated part to perform channel tracking to modify the channel estimates as more data is received.

Referring back to FIG. 1, the Fourier transformer 111 transforms the complex baseband time-domain samples of the long symbols 207, 209 of the preamble 201, and the data-carrying OFDM symbols of the modulated part of received packet into complex frequency domain samples by a DFT operation. In one embodiment, these are in bit-reversed frequency order. In one embodiment, the output of Fourier transformer 111 is in rectangular coordinates (e.g., I,Q).

In one embodiment, the subcarriers corresponding to the first and the second long symbols are input into a channel response estimator/tracker block 119 and used to form a function of the initial channel estimate. The channel estimator/tracker 119 produces a function of initial estimates of the different channels for each of the subcarriers.

Each long symbol consists of 53 subcarriers (including a zero value at dc), and is designed to exercise every subcarrier all at the same amplitude, with some subcarriers at 0° phase, while others at 180°. The two long symbols provide for better channel estimates than by using only one long symbol.

One embodiment of how the channel estimator initially determines the channel responses is described in above-referenced related and incorporated-by-reference U.S. patent application Ser. No. 10/217,117 titled CHANNEL ESTIMATION IN A MULTICARRIER RADIO RECEIVER (the Parent Patent Application, now U.S. Pat. No. 7,161,896). More details also are provided below.

By a channel estimate for a subcarrier is meant the impulse response or frequency response of that subcarrier's channel. In one embodiment, the channel estimator/tracker 119 estimates the amplitude and phase responses for the subcarriers in polar—e.g., amplitude and phase—coordinates, while in another the channel estimator/tracker 119 estimates the responses for the subcarriers in rectangular coordinates.

Channel corrector block 115 corrects the subcarriers for the different channels each experiences, and uses the channel estimator/corrector output for the channel correction.

As described in more detail below, in the case that the channel correcting of unit 115 is in polar coordinates, and the channel estimator/tracker 119 produces initial estimates in rectangular coordinates, a rectangular-to-polar coordinate transformer, e.g., a Cordic, is used to transform to the polar coordinates. In FIG. 1, is assumed that the Fourier transformer 111 outputs in rectangular coordinates, and the channel corrector 115 corrects in polar coordinates, so that a rectangular-to-polar transformer 113 such as a Cordic is included between FFT 111 and corrector 115. Furthermore, in FIG. 1, the channel estimator/tracker 119 produces the function of the channel estimates in rectangular coordinates, so that another rectangular-to-polar transformer such as a Cordic is shown between the estimator/tracker output 119 and the channel input of the corrector 115.

The function of initial channel estimates produced by some embodiments is, for each subcarrier, the initial channel estimates multiplied by the known value of the subcarrier for each of the long symbols. For such embodiments, a factoring by the known long symbol subcarrier value needs to occur prior to the channel correcting, or concurrent with the channel correcting of unit 115. In other embodiments, the function of initial channel response is the initial channel response, such that the factoring occurs before the channel estimator/tracker 119, such as 1203.

According to the OFDM variants of the IEEE 802.11 standard, four of the subcarriers in each data symbol are pilots that can be used for further frequency/phase correction and also for further amplitude correction. In receiver 100, the equalized signals are coupled to a pilot tone correction unit 117 for further frequency/phase correction.

The other elements of receiver 100 include a demodulator 123, a de-interleaver 125, a symbol inserter (de-puncturer) 127, a Viterbi decoder 129 and a descrambler 131 that together demodulate and decode the received 64-samples frames to produce a serial bit stream. Not shown is a parallel-to-serial converter that reads out the FFT output in serial form. Also not shown is any serial-to-parallel converter that converts the serial stream to parallel words at the output.

The path of receiver 100 from the channel corrector 115 to the descrambler 131 together form a demodulating and decoding path that accepts, demodulates, and decodes the set of received subcarriers to form decoded data.

Initially, the demodulating and decoding elements are set to process the SIGNAL field. Once the RATE information, including the modulation scheme is determined, these elements are set to demodulate the data frames of the payload. In this embodiment, the Viterbi decoder 129 is a ½-rate decoder, and the symbol inserter 127 is included to insert dummy signals to convert non-½ rate data into data suitable for the Viterbi decoder 129.

One embodiment includes a channel state information (CSI) processor 151 that produces an indication of the quality ("channel state") of each subcarrier's channel that is used by the demodulation and decoding path. The demodulator 123 produces pre-decoding soft decisions that are weighted by a channel state information (CSI) weight block 143 so that data from subcarriers that are less reliable are weighted less than subcarriers that of the more reliable channels. The CSI processor 151 uses the function of the channel estimate from channel estimator 119 as well as the output of the FFT, and the weighting is by a CSI signal for each subcarrier that is generated by a CSI processor 151.

In an alternate embodiment (not illustrated here), the pilot correction unit 117 also uses the CSI channel state signal. The pilots used in the correction by unit 117 are each weighted by the respective CSI signal so that pilots that are relatively unreliable are weighted less in the correction than more reliable pilots.

One embodiment uses a CSI processor 151 as described in U.S. application Ser. No. 10/418,694 to Paranjpe et al., filed Apr. 18, 2003 and titled DECODING METHOD AND APPARATUS USING CHANNEL STATE INFORMATION FOR USE IN A WIRELESS NETWORK RECEIVER. U.S. application Ser. No. 10/418,694 is incorporated herein by reference.

The embodiment shown in FIG. 1 further includes a signal quality measure unit that determines a measure of the signal quality of the modulated data. One embodiment uses a device that determines a measure of the error vector magnitude (EVM). The receiver thus includes an EVM calculator 135 coupled to and accepting input from the pilot correction unit via the polar to rectangular converter 121, i.e., accepting pre-decision I,Q samples. The EVM calculator determines a measure of the EVM of the OFDM symbols in the packet. The EVM determination depends on the ideal constellation points for the particular modulation type. Hence, EVM calculator 135 also accepts RATE information.

U.S. patent application Ser. No. 10/367,010 to Ryan et al., titled SELECTING THE DATA RATE OF A WIRELESS NETWORK LINK ACCORDING TO A MEASURE OF ERROR VECTOR MAGNITUDE, described a signal quality measuring circuit that is used in one embodiment. Patent application Ser. No. 10/367,010 is incorporated herein by reference.

In one embodiment, the EVM measure for the SIGNAL part and the EVM measure for the data part of each arriving packet are separately determined. One aspect of the invention is that the amount of modifying of the initial response, e.g., the amount of tracking depends on the signal quality, e.g., of the SIGNAL part of the packet.

Not shown are any buffers required for buffering information while the SIGNAL field is demodulated and decoded to produce the modulation type and coding rate of the remainder of the packet, shown as RATE in FIG. 1.

Note that while coordinate transformers 113 and 121 are shown, other coordinate transformer(s) such as Cordics to transform back and forth between rectangular (I-Q) and polar coordinates may be used, and are not shown in FIG. 1.

Aspects of the invention are embodied in the channel estimator/tracker 119 and the methods used therein. FIG. 1 shows a channel estimator/tracker 119 that uses hard demodulator decisions to update channel estimates in a simple manner. The channel estimator/tracker version shown in FIG. 1 accepts post pilot correction constellation values for making the hard decisions. The pilot correction circuit corrects for channel drift and/or timing errors, such that the channel corrector 115 need not account for the carrier drift and the timing errors in correcting for the channel. The channel estimator/tracker version shown in FIG. 1 also accepts signals from the pilot corrector. Other embodiments need not include this feature. The channel estimator/tracker version shown in FIG. 1 also uses the signal quality (e.g., EVM) from EVM unit 135 to decide if the channel estimate can be reliably updated. Other embodiments need not include this feature.

Figure 3:
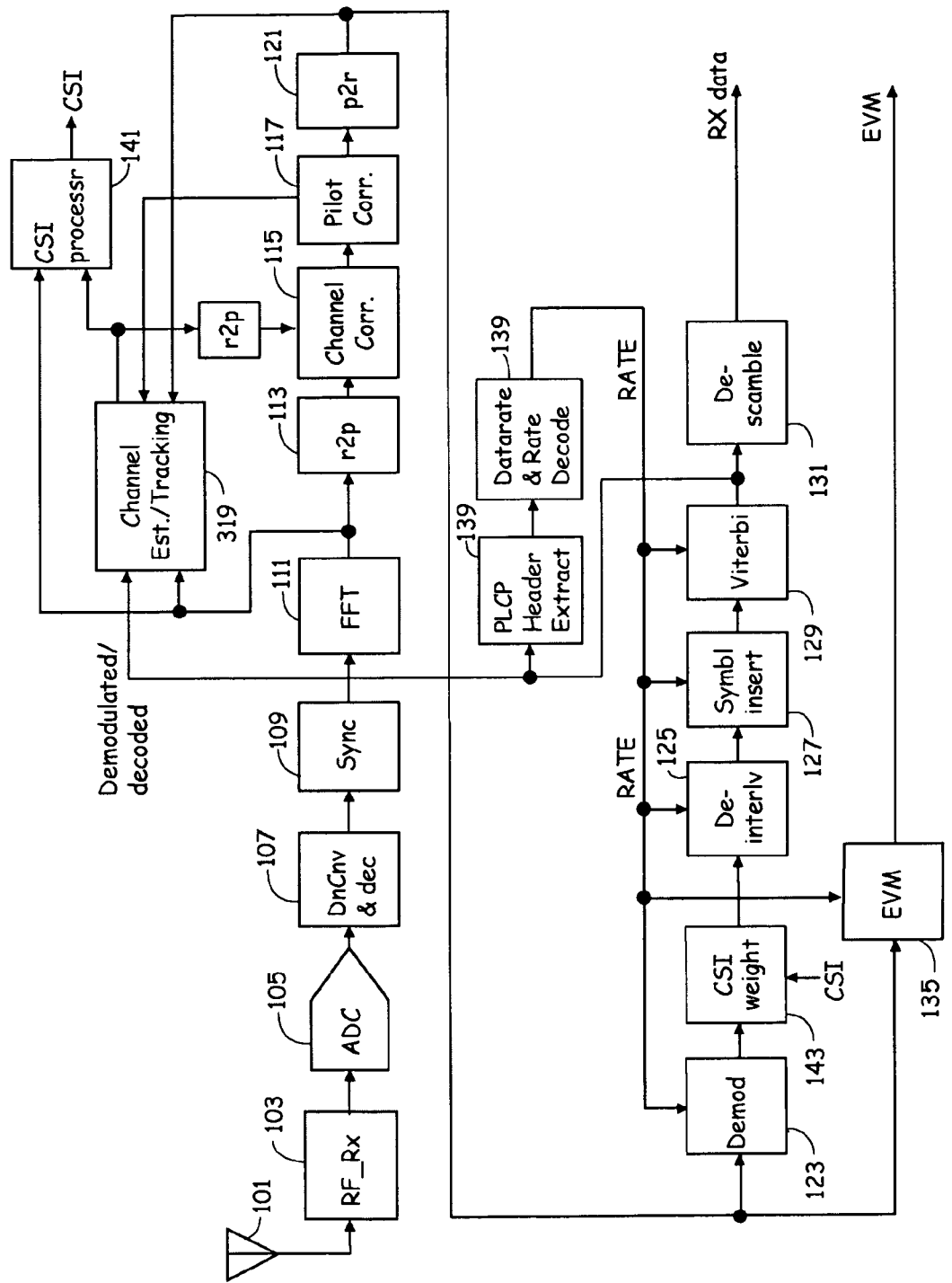
FIG. 3 shows a receiver that uses a channel estimator/tracker that, rather than forming hard demodulator decisions, uses decoded-re-encoded decisions to update channel estimates according to an embodiment of the invention.

FIG. 3 shows a receiver that uses a channel estimator/tracker 319 that, rather than form hard demodulator decisions, includes the decoded symbols, and includes re-encoding and re-modulating these signals, thus, uses re-encoded decoded decisions to update channel estimates in a simple manner. The channel estimator/tracker 319 does not include the feature of accepting the EVM input, since, if the decoded decisions are wrong, it is irrelevant what the channel/tracker does.

Operation of different embodiments of the channel estimator/tracker is now described in detail.

Figure 4:
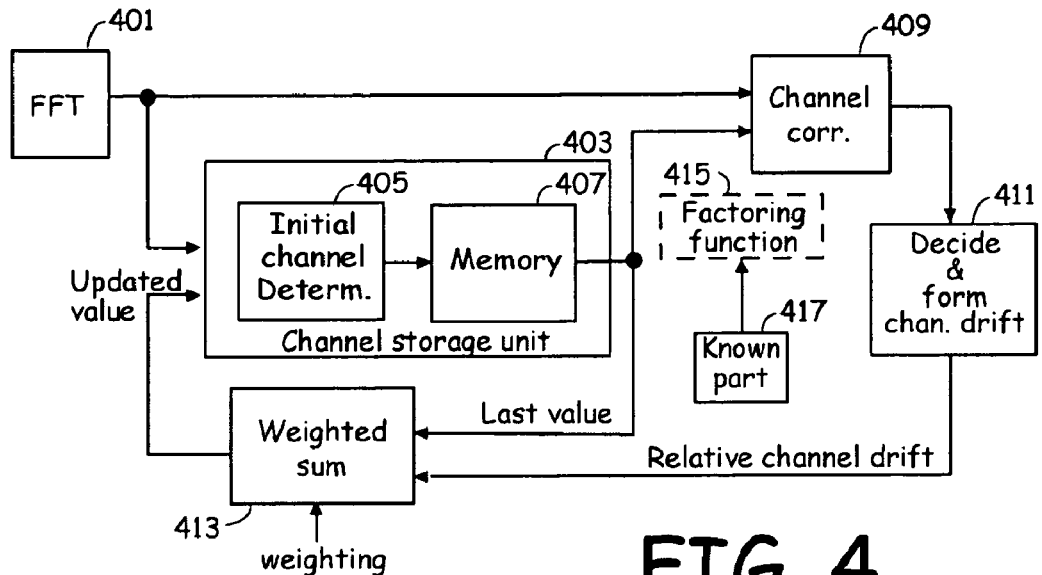
FIG. 4 shows one simplified block diagram of an embodiment of an apparatus that includes a channel estimator/tracker for inclusion in an OFDM receiver such as that shown in FIG. 1 or FIG. 3.

FIG. 4 shows one simplified block diagram of an embodiment of an apparatus that includes a channel estimator/tracker for inclusion in an OFDM receiver such as that shown in FIG. 1 or such as that shown in FIG. 3, i.e., to use as channel estimator/tracker 119 or 319. The receiver wirelessly receives a packet of information that includes a known transmitted part, which, for packets conforming to OFDM variants of the IEEE 802.11 standard, includes the first and second long symbol. The receiver includes a signal-to-tone transformer 401—such as FFT calculator 111—to determine the subcarriers of a signal corresponding to a received packet.

The channel estimator/tracker includes a channel storage unit 403 connected to the signal-to-tone transformer 401. The channel storage unit 403 has an initial channel calculator 405 that uses the known part of the received packet for the subcarriers to calculate a function of the initial channel response of subcarriers from the known subcarrier values of the known part of the received packet, and a memory subsystem 407 connected to the initial channel calculator 405. The memory subsystem 407 initially stores the function of the initial channel response, and then, as more of the packet is received, stores updates of the function of the initial channel response.

The output of the memory subsystem 407 forms the output of the channel estimator/tracker, and is connected to the channel input of a channel corrector 409, e.g., the channel corrector 115 of FIG. 1. The signal input of the channel corrector 409 is connected to the output of the signal-to-tone transformer 401. The channel corrector 409 corrects each subcarrier of the received signal for the channel using the contents of the memory subsystem. The output of the channel corrector 409 is a set of channel corrected constellation values for each subcarrier of the received signal.

The channel estimator/tracker uses a decision and channel drift circuit 411 coupled to the channel corrector 409 to form post-decision constellation values corresponding to the channel corrected constellation values for each subcarrier, and also to form a measure of the channel drift from the post decision constellation values and the pre-decision constellation values.

The channel estimator/tracker includes a weighting circuit 413 coupled to the channel storage unit 403 to update the memory subsystem contents with a weighted average (a weighted sum) of the pre-update contents of the memory subsystem 407 and an update. The update is determined from the memory subsystem contents and the measure of the channel drift between symbols for each subcarrier. The apparatus is arranged such that the memory subsystem contents in memory subsystem 407 track channel drift for each subcarrier, e.g., from symbol to symbol. The tracking is according to the relative weightings of the weighted sum of the weighting circuit 413.

While embodiments described herein update the channel symbol-to-symbol, alternate embodiments only track every two symbols, other alternate embodiments every three symbols, and so forth.

For channel correcting, the known value of each subcarrier needs to be factored out of the response to the known part of the packet for the subcarrier. Thus, the apparatus includes a factoring function (shown as 415) that factors out the known part 417.

In one embodiment, the function of the channel response stored in the memory subsystem for a subcarrier is the channel response for the subcarrier multiplied by the known value of the subcarrier for the known part, such that a factoring of the known part needs to occur prior to the channel correcting, or concurrent with the channel correcting.

Figure 5:
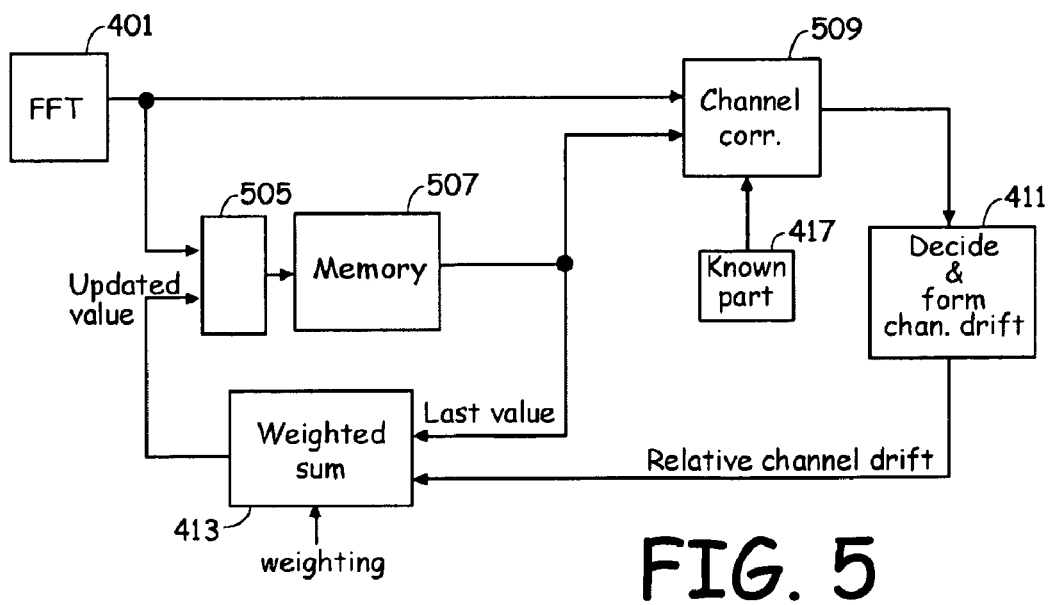
FIG. 5 shows a simplified block diagram that shows a channel estimator/tracker embodiment, and that further shows a channel corrector embodiment that includes factoring by the known part of a packet.

FIG. 5 shows a channel corrector 509 that includes factoring by the known part 417. The apparatus shown in FIG. 5 includes an initial channel calculator 505 that loads the received subcarriers for the known part, that is, the product of the channel response multiplied by the known subcarrier values during receipt of the known part of the packet, and then switches to accept from the weighting unit 413 during receipt of the modulated part such that the memory shown as memory 507 is loaded with updated values.

Figure 6:
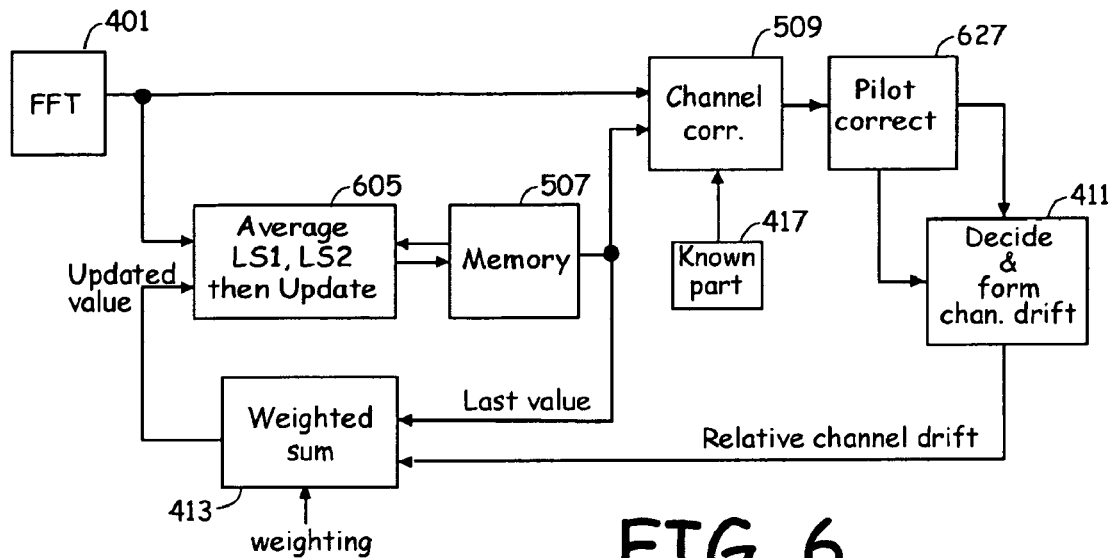
FIG. 6 shows an embodiment of the apparatus of FIG. 5 in more detail.

FIG. 6 shows an embodiment of the apparatus of FIG. 5 in more detail. The receiver is for receiving packets that conform to one of the OFDM variants of the IEEE 802.11 standard, so that the known part of the packet includes a first part of at least one known symbol and a second part of at least one known symbol (e.g., the first and second long symbols). The initial channel calculator (now shown as unit 605 to indicate a set of features that not all embodiments of FIG. 5 may have) initially stores a function of the channel response based on received signals corresponding to the first part, in this case the received subcarriers for the first part, being the product of the known subcarrier of the first part and the channel response of the subcarrier. The initial channel calculator and memory are arranged to average the functions of the channel responses corresponding to the first and second parts, such that after the signals corresponding to the second known part are received, the function of the initial channel response in the memory 507 is the average of the functions of the channel responses corresponding to the first and second parts.

The subcarriers of the packet include pilot tones. The apparatus further includes a pilot correction circuit 627 between the channel corrector 509 and the decision and channel drift circuit 411. The pilot correction circuit corrects for either or both channel drift and timing errors, such that the channel corrector 509 need not account for the carrier drift and the timing errors in correcting for the channel.

Figure 7:
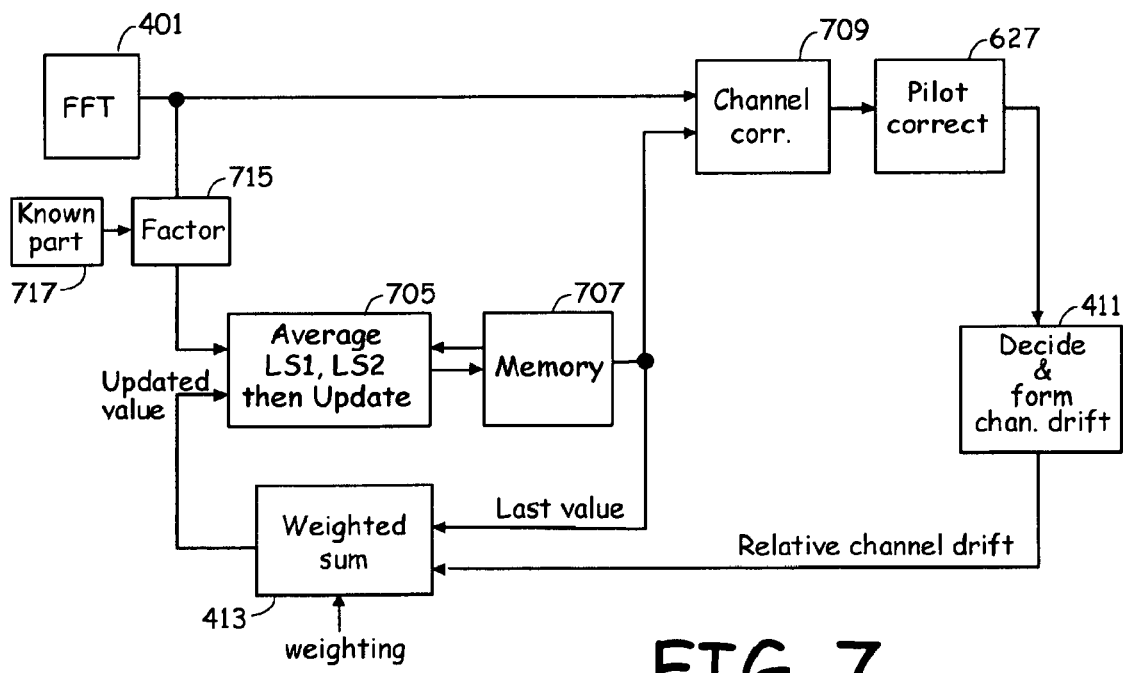
FIG. 7 shows one simplified block diagram of an embodiment of a channel estimator/tracker wherein the function of the channel response stored in a memory subsystem for each subcarrier is post factoring by the known value of the subcarrier for the known part of a packet.

In other embodiments, the function of the channel response stored in the memory subsystem for a subcarrier is post factoring by the known value of the subcarrier for the known part, such that a factoring of the known part is included prior to the input from the signal-to-tone transformer to the memory subsystem. FIG. 7 shows one such embodiment. A factoring unit 715 is included such that during receipt of the first and the second parts, the known subcarriers of the known first and second parts—e.g., the subcarriers of the long symbol—are factored out of the respective subcarriers of the received packet from the signal-to-tone transformer 401, such that, after the second long symbol is received, the memory contains the average of the channel response for the subcarriers. At this point in time, the initial channel calculator, shown as unit 705, switches to accept updated channel responses from the weighting unit 413.

Figure 8:
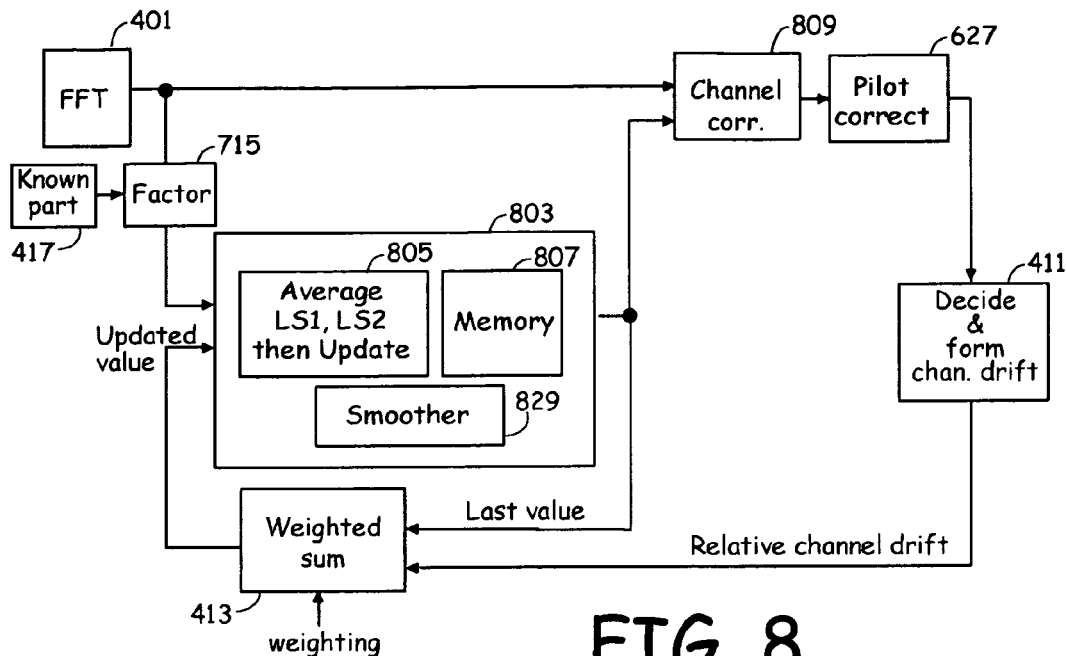
FIG. 8 shows a simplified block diagram of another embodiment, which includes a channel smoother to smooth the initial channel response.

FIG. 8 shows another embodiment in which the channel storage unit, shown as unit 805, initially stores the channel response determined from the known part, and that includes a channel smoother 829 coupled to the memory, shown as memory 807, to smooth the channel responses to take into account correlation between channel responses of adjacent subcarriers.

The Parent Patent Application (incorporated-by-reference U.S. patent application Ser. No. 10/217,117, now U.S. Pat. No. 7,161,896) described many configurations of a smoother and initial channel calculator.

In some embodiments, the signal-to-tone transformer produces subcarriers in rectangular coordinates, the memory subsystem stores the function of the channel response in rectangular coordinates, and the channel corrector corrects for the channel in polar coordinates. Each such embodiment includes an appropriately placed coordinate transformer, such as a Cordic to transform the memory output to polar coordinates prior to channel correcting.

In other embodiments, not described in detail herein, the output of the signal-to-tone transformer is provided as subcarriers in rectangular coordinates, and the memory subsystem stores the function of the channel response in polar coordinates. Again, each such embodiment includes an appropriately placed coordinate transformer, such as a Cordic between the signal-to-tone transformer and the input to the memory subsystem.

As shown in FIG. 1 above, in some embodiments, the decision and channel drift circuit forms a hard decision from the provided constellation values, e.g., the pilot corrected constellation values.

As shown in FIG. 3 above, in some embodiments, the decision and channel drift circuit uses decoded decisions and re-encodes the decoded decisions to generate the post-decision constellation values corresponding to the channel corrected constellation values for each subcarrier, and also to form a measure of the channel drift from the post decision constellation values and the pre-decision constellation values.

Figure 9:
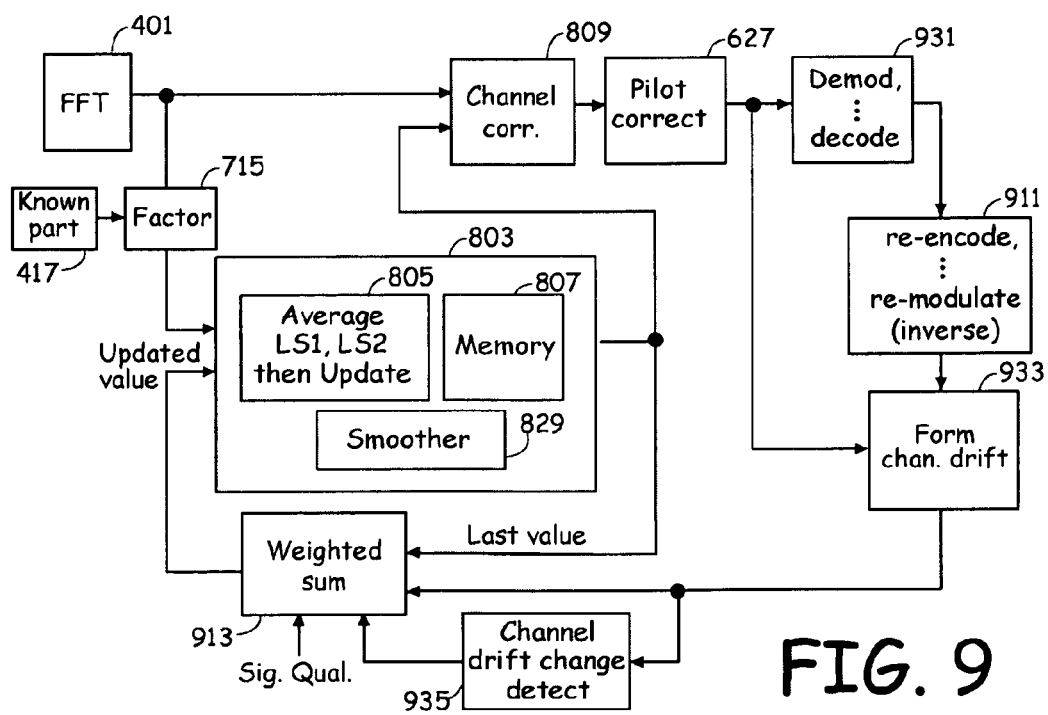
FIG. 9 shows a simplified block diagram of an embodiment that includes the channel smoother of FIG. 8, and that further includes a demodulation-decoding chain and a re-encoder, such that the tracking uses de-coded-re-coded decisions.

FIG. 9 shows an embodiment that includes the channel smoother of FIG. 8, and that further includes a demodulation-decoding chain 931, e.g., the demodulation/CSI/de-interleaving/symbol-insertion/decoding chain shown in FIG. 3. In one embodiment, the receiver includes a circuit 911 to re-encode and remodulate (inverse remodulate in one version) the decoded signal, and a circuit 933 to form the channel drift using the decoded-re-encoded decision values and the post-pilot correction constellation values to form the measure of the channel drift.

One aspect of the invention is that the update signal and updating do not require a division by the channel response.

The embodiment shown in FIG. 9 further includes a channel drift-change detector 935 to provide a measure of how rapidly the measure of the channel drift varies over time. The measure provides an indication of how worthwhile tracking the channel is, such that the relative weighting of the weighting circuit, shown as weighting circuit 913, is a function of the detected change in channel drift. In one version, the memory 807 is updated only if the detected change in channel drift exceeds a change threshold from symbol-to-symbol.

The embodiment shown in FIG. 9 also assumes that the receiver provides a measure of the signal quality, e.g., a measure of the EVM. In one version, the relative weightings of the weighting circuit of the weighted sum is a function of the measured signal quality.

In one version, the receiver is to receive a packet that includes a field modulated at a known rate, e.g., the SIGNAL field in the 802.11 OFDM case. The receiver's circuit to measure the signal quality provides a measure of the signal quality of the received SIGNAL field. The memory subsystem is updated only in the case that the measure of signal quality of the received SIGNAL field is above a signal quality threshold.

This can be implemented either by indeed causing the weighting to have values such that no updating occurs, or by directly having logic in unit 805 that causes no updating in the case the threshold is not met. Note that typically, the threshold is dependent on the type of modulation indicated by the SIGNAL field.

While in one embodiment, the decision and channel drift circuit operates in rectangular coordinates, in other embodiments, the decision and channel drift circuit operates in polar coordinates.

Note that while the above mainly describe apparatus embodiments of the invention, aspects of the invention are also implemented as methods. Thus, one embodiment of the invention is a method to estimate and track the channel response for subcarriers of signals received in an OFDM receiver. The received signals correspond to a packet of information that includes a known transmitted part, which, for packets conforming to OFDM variants of the IEEE 802.11 standard, includes the first and second long symbol. The method includes accepting subcarriers corresponding to a received packet. The method further includes calculating a function of the initial channel response of subcarriers from the known subcarrier values of the known part of the received packet, and storing the function of the initial channel response. The method further includes, as more of the packet is received, storing updates of the function of the initial channel response.

The method includes correcting the received subcarriers using the stored function of the initial or updated channel response to form a set of channel corrected constellation values for each subcarrier of the received signal.

The method further includes making decisions from the channel corrected constellation values to form post-decision constellation values corresponding to the channel corrected constellation values for each subcarrier. The method further includes forming a measure of the channel drift from the post decision constellation values and the pre-decision constellation values.

The method further includes forming a weighted sum of the pre-update stored function of the channel response and an update determined from the pre-update stored function of the channel response and the measure of the channel drift between symbols for each subcarrier, and storing the updated values. The stored function of the channel response tracks the current channel for each subcarrier, e.g., with an update once per symbol, with the tracking according to the relative weightings of the weighted sum.

The following equations describe the basis of the updating for a subcarrier of the set of subcarriers in the following embodiments that are described in more detail. In each of the equations, an indicator of the subcarrier, e.g., the i'th subcarrier is omitted. The equations apply to each subcarrier that is updated. Furthermore, in the following discussion, a superscript n denotes the n'th symbol or the constellation value around that n'th symbol. In the presence of noise, suppose a symbol $X^n$ is transmitted in the channel of the subcarrier. The received n'th constellation value (a complex valued quantity), denoted $Y^n$ as a result of passing through the channel whose response for the subcarrier is denoted $H^n$ can be written as $$Y^n = H^n X^n + N^n$$

where $N^n$ denotes the noise in the received n'th symbol.

Denote by $\tilde{H}^{n-1}$ the channel response for the subcarrier determined from all previous symbols, i.e., including the previous (n−1) updates. It is a function of this channel response that is stored in the memory subsystem (e.g., memory subsystem 407 of FIG. 4) and that is used by the channel corrector to correct the received signal around the n'th received constellation point for the effects of the channel. The channel correction essentially performs the following operation:

$$\tilde{X}^n = \frac{Y^n}{\tilde{H}^{n-1}},$$

where $\tilde{X}^n$ denotes the corrected n'th constellation value for the subcarrier.

Denote by Q( ) the operation of making a decision, e.g., a decision on a received constellation value in the decision and channel drift circuit 411. Denote by $\hat{X}^n$ the symbol that results from making a decision on the n'th channel corrected constellation value $\tilde{X}^n$. Note that for simplicity, any pilot correction is omitted. Then $$\hat{X}^n = Q(\tilde{X}^n) = Q\left(\frac{Y^n}{\tilde{H}^{n-1}}\right).$$

Consider the symbols, and denote the n'th symbol that was actually transmitted in the i'th subcarrier by $X^n$. Denote the channel that this subcarrier experiences around the n'th symbol as $H^n$.

In one embodiment of the invention, the decision and channel drift circuit determines a relative measure of the channel drift as the ratio of the pre-decision channel corrected n'th constellation value $\tilde{X}^n$ and the post-decision value $\hat{X}^n$. That is $$\frac{\tilde{X}^n}{\hat{X}^n} = \frac{Y^n}{\tilde{H}^{n-1}\hat{X}^n} = \frac{H^n X^n + N^n}{\tilde{H}^{n-1}\hat{X}^n} \approx \frac{H^n}{\tilde{H}^{n-1}}$$

The operation of the weighting circuit, e.g., circuit 413 of FIG. 4 generates the update according to:

$$\tilde{H}^n = (1-k_1)\tilde{H}^{n-1} + k_1\left(\frac{\tilde{X}^n}{\hat{X}^n}\right)\tilde{H}^{n-1} \approx (1-k_1)\tilde{H}^{n-1} + k_1 H^n.$$

where $\tilde{H}^n$ is the updated channel estimate, such that a function of $\tilde{H}^n$ is stored in the memory subsystem.

Denote by $X_{LS}$ the known long symbol of the first and second long symbols of the preamble. In the embodiments shown in simple form in FIGS. 5 and 6, the product of the known long symbol and the channel estimate based on the past, that is, $X_{LS}\tilde{H}^{n-1}$, is kept in the memory element 507. The relative measure of the channel drift is the same ratio of the pre-decision and post decision constellation values, and the weighting and updating is described by:

$$X_{LS}\tilde{H}^n = (1-k_1)X_{LS}\tilde{H}^{n-1} + k_1\left(\frac{\tilde{X}^n}{\hat{X}^n}\right)X_{LS}\tilde{H}^{n-1}$$

$$\approx (1-k_1)X_{LS}\tilde{H}^{n-1} + k_1 X_{LS}H^n.$$

Figure 10:
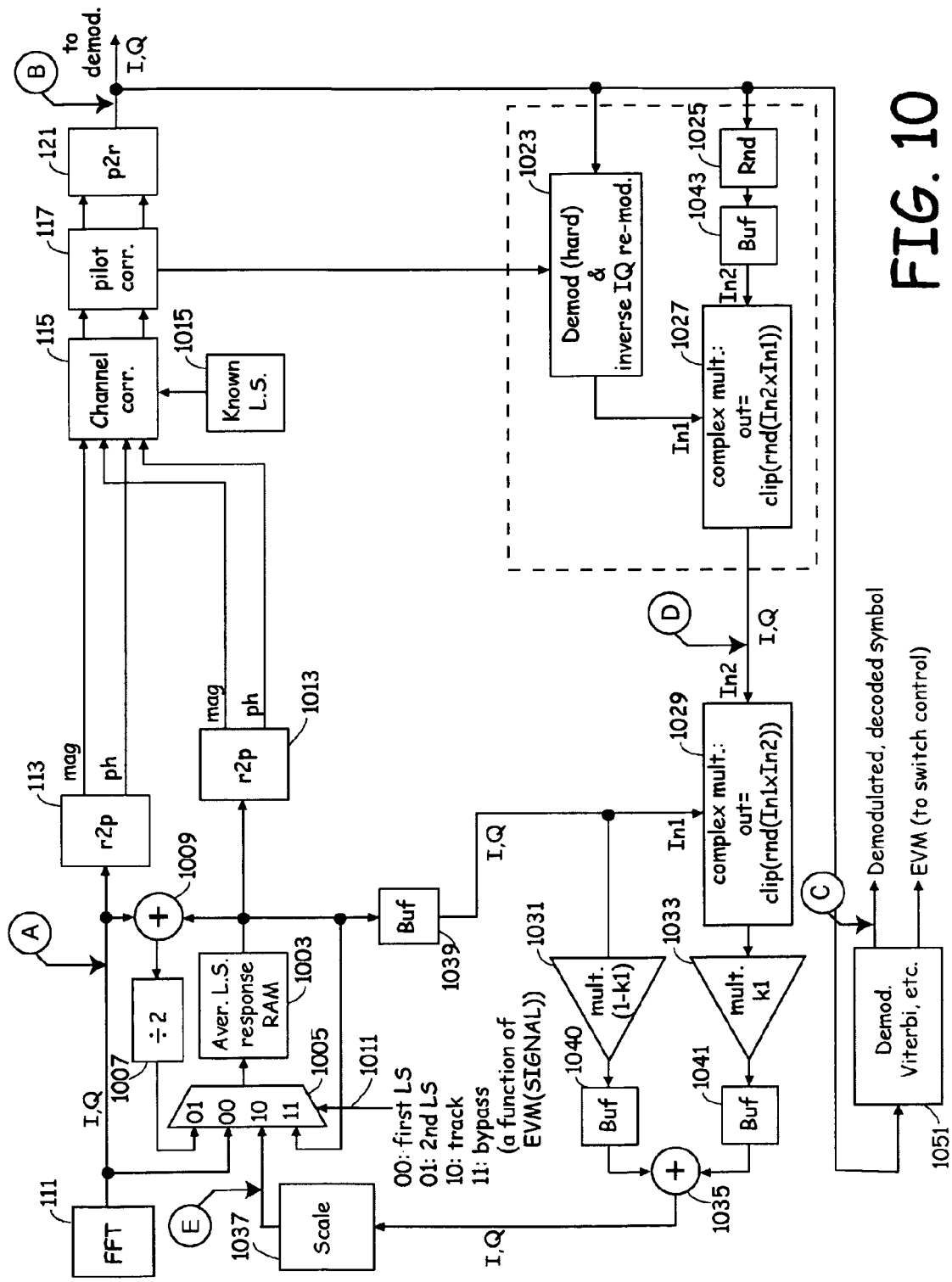
FIG. 10 shows a block diagram that includes, in more detail, a channel estimator/tracker embodiment that uses the general architecture shown in FIG. 6.
Figure 11:
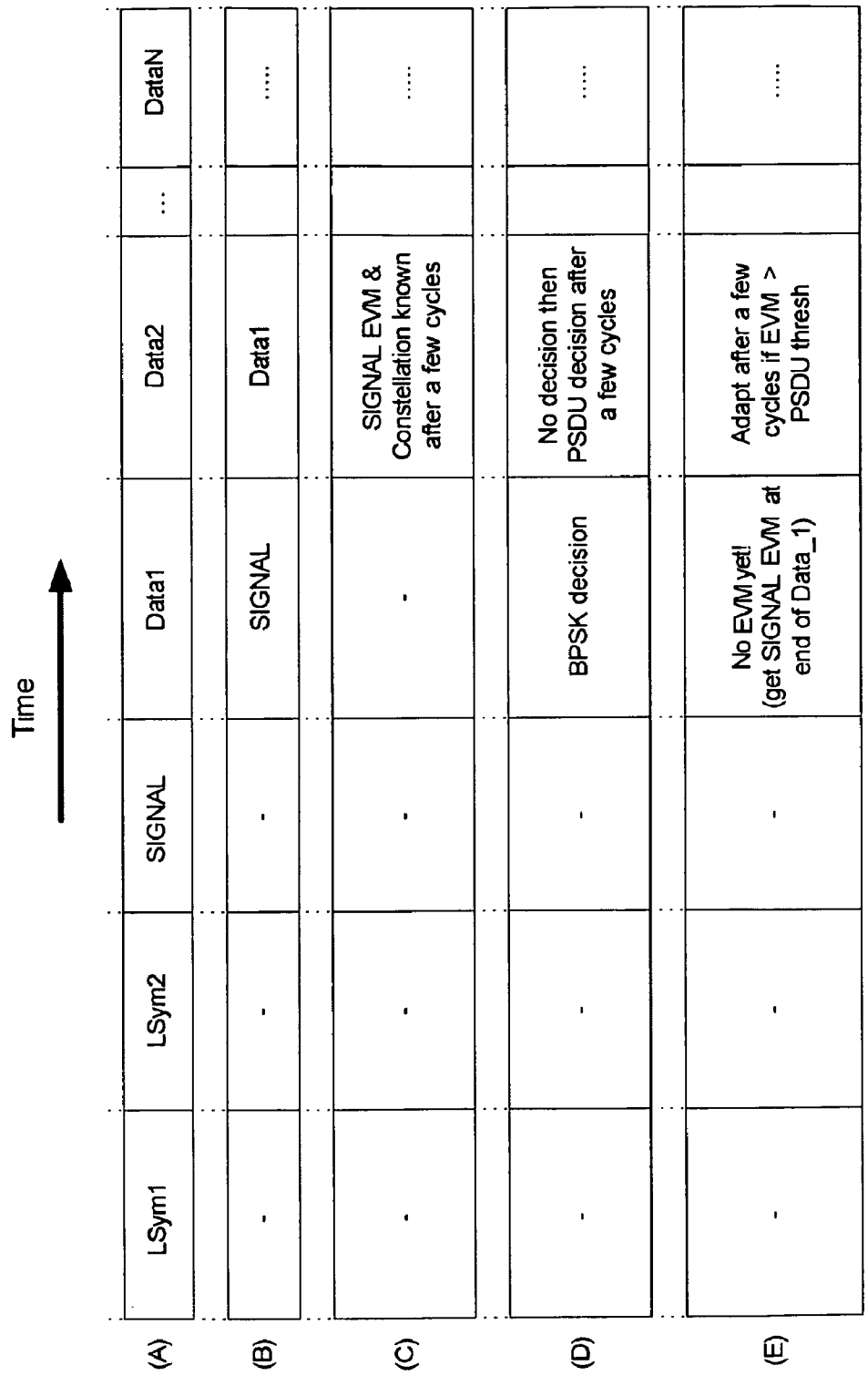
FIG. 11 shows, as an example, the sequence of operations, including what data appears at points A, B, C, D and E in the datapath shown in FIG. 10 when there is updating of the estimated channel response. Note that the timing shown is for the case of hard demodulated data used for the channel estimate updating

FIG. 10 shows a block diagram that describes a channel estimator/tracker embodiment that uses the general architecture shown in FIG. 6. It will be described here in the context of being used in receiver of FIG. 1 to form the channel estimator/tracker 119.

The FFT unit produced subcarriers in rectangular coordinates, e.g., as I,Q values. The switch unit 1005, summer 1009, and divide-by-two circuit 1007 together with the generator of a two-bit control signal 1011 for the switch unit 1005 form the unit 605 of FIG. 6, and a RAM 1003 is used as the memory subsystem. The contents of RAM 1003 are stored in rectangular coordinates.

The incoming complex frequency domain samples from the FFT unit 111 arrive and are processed in bit-reversed frequency order.

Initially, during the first long symbol, the control signal 1011 is 00 and the output of the FFT 111 is stored in the RAM 1003. During the second long symbol, the control signal 1013 is 01 and sets the switch to input the output of the divide by two circuit 1007 into the RAM. The adder 1009 adds the contents of the memory with the response during the second long symbol to form the sum. The divide-by-two circuit 1007 forms the average that is input to the RAM via the switch unit 1005.

Thus at the end of the preamble, the memory contains for each subcarrier the average of the product of initial channel response estimates multiplied by the subcarrier value of the known long symbol.

The embodiment shown allows the control signal 1011 to now become 11 such that the memory contents are no longer updated. For example, those embodiments wherein whether or not the channel estimate is updated may cause no further updating by setting the control signal to 11. Alternately, the no-updating may be caused by loading a zero weighting in the weighting unit.

As each OFDM symbol is processed, each channel output from the FFT 111 is corrected by the channel corrector 115. In the embodiment shown in FIG. 10, the correction is carried out in polar coordinates. Thus, a first rectangular-to-polar converter 113 converts the received values to polar coordinates, while a second rectangular-to-polar converter 1013 converts the stored function of the channel estimates to polar coordinates. The channel corrector 115 effectively multiplies the received signal by the inverse of the present update of the average channel response. In one embodiment, the channel corrector uses ratio-multiplication to correct the magnitude and an addition to correct the phase. The phase correction is calculated as the phase difference between the average channel response and the phase of the transmitted long symbols stored in RAM. The magnitude correction is executed by multiplying each subcarrier magnitude by the ratio of the transmitted long symbol response stored in RAM, to the average long symbol response The transmitted long symbol magnitude and phase for each tone is contained in a long symbol reference response RAM 1015. While the preferred embodiment operates according to the OFDM variants of the IEEE 802.11 standard in which the long symbol subcarriers have a constant magnitude and phase is one of ±180°, the embodiment shown in FIG. 10 allows long symbols with arbitrary amplitude and phase components to be used.

In decision-directed channel tracking mode, the sequence of operations involved in updating the channel response is summarized in FIG. 1. It shows the data processing as well as the approximate latencies, at point A, B, C, D and E in the datapath shown in FIG. 10.

The FFT output for the sequence of OFDM symbols during an IEEE 802.11a (or 11g) packet are shown on the first line of FIG. 1. The packet includes, in time order, the first long symbol (Lsym1), the second long symbol (Lsym2), the SIGNAL field, and the data parts denoted Data1, Data2, . . . , DataN.

There is a one symbol latency in performing the channel estimation and correction as shown at B. Another symbol period passes before the SIGNAL field EVM is available at point C.

In one embodiment, the EVM of the SIGNAL field is used such that only if EVM(SIGNAL) exceeds a threshold does updating occur. Thus, once the first bit of control signal 1011 is set to 1, the second bit of control signal 1011 is set to 0 until the threshold of EVM falls below a settable threshold.

Different thresholds are used for different types of modulation.

A polar to rectangular coordinate converter 121 converts the pre-decision channel-corrected and pilot corrected constellation values to rectangular coordinates. As the modulated data arrives, the data is demodulated, decoded, and so forth, in datapath 1051, including forming the EVM measure of SIG- NAL for the control signal 1011 to determine whether or not it is worth updating the RAM contents. Furthermore, as the modulated data arrives, a hard demodulator and inverse remodulator 1023 forms a hard decision at the constellation point, and inverse re-modulates, i.e., modulates with the inverse of the amplitude and the opposite phase of the decision obtained from the pre-decision channel- and pilot-corrected constellation point value. This forms a quantity that varies as $$1/\hat{X}^n$$

using the above notation for the subcarrier. A complex multiplier 1027 multiples this quantity with the pre-decision constellation point value to form the measure of the relative channel drift. The embodiment shown includes a rounding unit. Furthermore, the complex multiplier includes clipping and rounding the output, and scaling one or both inputs to produce the desired number of bits for the measure of the channel drift. Also included is a FIFO buffer 1043 to ensure the samples arrive at point D at the appropriate time.

In one embodiment, the hard demodulator is data aided for pilots. Thus, a path is shown from the pilot correction to the demodulator-inverse re-modulator 1023.

The relative measure of the channel drift is multiplied with the previous contents of the RAM 1003 (containing the previous stored function of the channel response) by a second complex multiplier 1029. Multipler 1029 includes clipping and rounding the output, and scaling one or both of the inputs to produce the desired number of bits to match the scaling and number of bits in the RAM 1003. The multiplied output represents the function of the new estimate of the channel response. The functions of the new channel estimate and the functions of the previous channel estimates are now weighted by k1 and (1−k1), respectively by weighting unit 1031,1033, and the weighted quantities added by adder 1035. In some embodiments, a further scaling by scaler 1037 may be needed, depending on the scaling in the multiplying by k1 and (1−k1). Scaler 1037 is then used to scale, round, and clip as appropriate for writing into the RAM 1003.

This forms at point E the function of the updated channel estimate that is updated into the RAM 1003.

Delay buffers 1039, 1040, and 1041, like buffer 1043, are included and adjusted to ensure the signals are all synchronized and arrive at the respective locations at the correctly matched times.

Thus the RAM 1003 nominally contains the long symbol (in the frequency domain) multiplied by the channel transfer function. During the first long symbol, the IQ values are loaded directly. During the second long symbol, the first long symbol is retrieved, averaged with the arriving second long symbol, and returned to the RAM 1003. If channel tracking is bypassed or if the SIGNAL EVM does not exceed the constellation-dependent settable threshold, then the RAM 1003 is no longer updated with new values. In one embodiment, the RAM is refreshed with its previous values Otherwise, during subsequent symbols, a small proportion of the average as controlled by the parameter k1 is adapted according to the channel drift and returned to the RAM. In this way, the channel can be slowly tracked.

Another inventive aspect is that the tracked channel estimate updates the CSI. CSI, like channel estimation, is well known in OFDM. Referring again to the embodiments of FIG. 1 and FIG. 10 that use hard decisions, the CSI processor 143 is as described in above-referenced incorporated by reference U.S. application Ser. No. 10/418,694. One aspect of the invention is that the tracked channel estimate is used to improve CSI. In another aspect of the invention, once the CSI for a subcarrier drops below a settable value, i.e., the subcarrier enters a deep null, that subcarrier's CSI value is no longer updated. Thus, another aspect of the invention is to ensure that after suffering a deep null, CSI is non-increasing based on channel tracking.

While the embodiment shown in FIG. 10 forms hard decisions, one skilled in the art would find it straightforward to modify the datapath to be used in the receiver of FIG. 4, in which, the decisions are after de-interleaving, decoding, re-encoding, and re-interleaving the channel-corrected and pilot corrected data. This decoded-re-encoded data is inverse re-modulated and multiplied by the pre-decision channel-corrected and pilot corrected data to form the relative channel drift.

Figure 12:
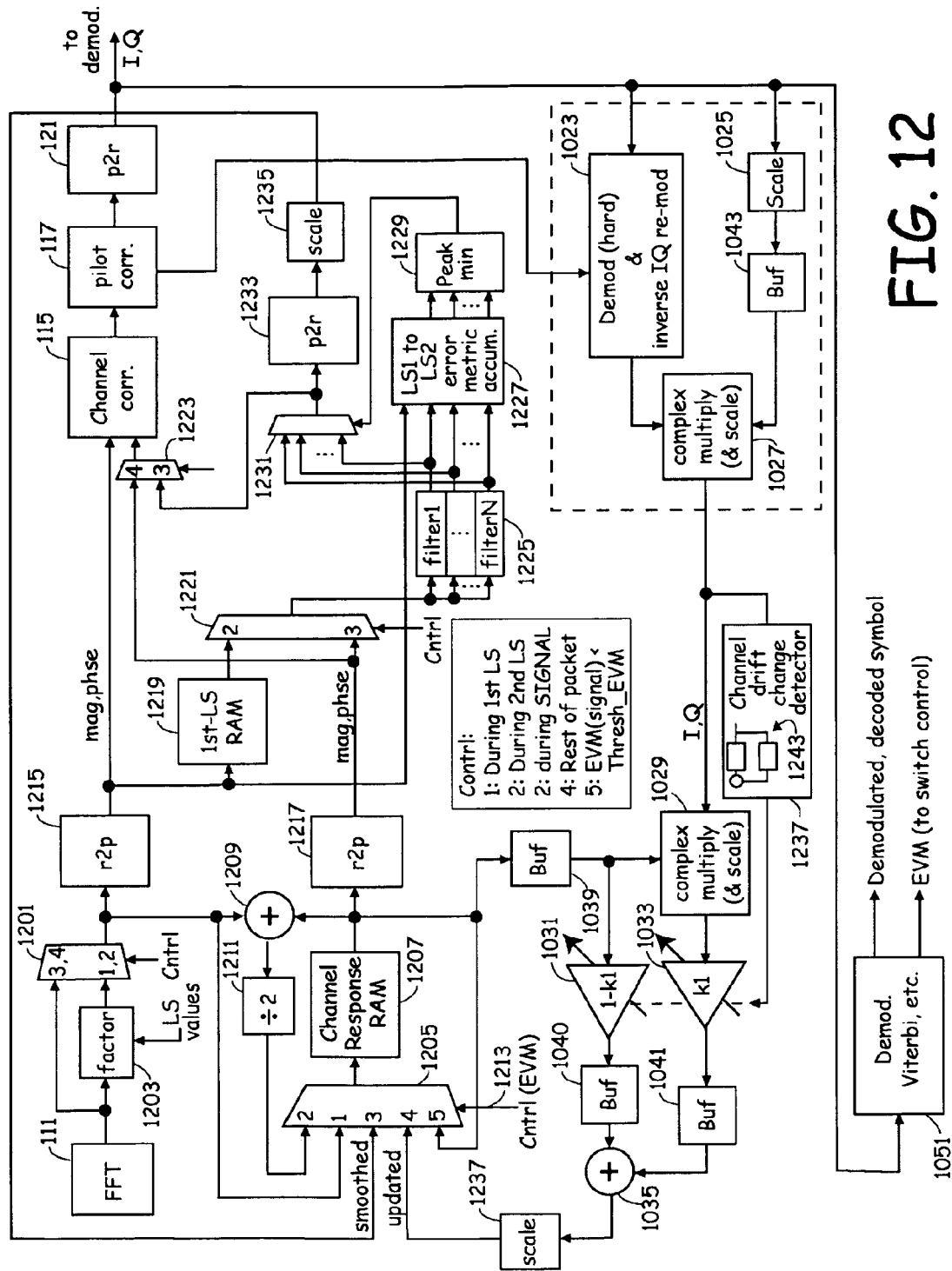
FIG. 12 shows in more detail an embodiment of a channel estimator/tracker that includes an adaptive channel smoother to smooth the initial channel estimate and that follows the general architecture shown in FIG. 8.

FIG. 12 shows an embodiment for a channel estimator/tracker that includes a channel smoother to smooth the initial channel estimate and that follows the general architecture shown in FIG. 8. The smoothing, moreover, is adaptive in that the amount of smoothing of the channel smoother is selected from a set of candidate smoothers according to how well the channel estimates produced by applying each candidate smoother to channel estimates produced from the first long symbol predict the received signal corresponding to the second long symbol.

The reference numerals assume many elements of the receiver shown in FIG. 1 are used.

The FFT unit produces subcarriers in rectangular coordinates, e.g., as I,Q values. The incoming complex frequency domain samples from the FFT unit 111 arrive and are processed in bit-reversed frequency order.

The factoring unit 1203 is switched in by unit 1201 during the preamble, i.e., during the first and second long symbols, to factor out the known subcarrier values of the first and second long symbols, such that the channel response for each subcarrier is determined from each of the first and second long symbols during the preamble.

The switch unit 1205, summer 1209, and divide-by-two circuit 1211 together with the generator of a two-bit control signal 1213 for the switch unit 1205 form the unit 605 of FIG. 6, and a RAM 1207 is used as the memory subsystem. The RAM 1207 stored in rectangular coordinates.

The control signal is encoded with values that reflect 1, 2, 3, 4, and 5. 1 and 2 are during the reading out from the FFT 111 of the received subcarriers from the first and second long symbols, respectively, 3 is for the subcarriers of the SIGNAL field of a received packet, and 4 are for the subcarriers of the rest of the modulated part of the received packet. 5 is a bypass mode.

Some bits of the control signal 1213 also may be used for unit 1201, 1221 and 1223.

Initially, during the first long symbol, the output of the FFT 111 is factored and a first channel estimate is stored in the RAM 1207. At the same time, the channel estimates using the first long symbol are converted to polar via rectangular-to-polar converter 1215 and stored in a RAM 1219.

During the second long symbol, the control signal 1213 sets the switch 1205 to input the output of the divide by two circuit 1211 into the RAM 1207, such that the RAM now stores the average of the channel response from the first and second long symbols. Thus at the end of the preamble, the memory contains for each subcarrier the average of the initial channel response estimates.

During the second long symbol, the control signal is such that a switch 1221 selects to input the channel estimate using the first long symbol read out from the memory 1219 into a set of different smoothing filters. Each smoothing filter produces a first set of candidate smoothed versions of the channel estimates using one of the respective smoothing filters. In one embodiment, one such "smoothing" filter is a null filter, which performs no smoothing so that one of the possible selections is no smoothing. This, for example, might be the choice selected by the adaptive smoother in a highly dispersive channel.

The smoothed set of candidate smoothed channel estimates is compared to the set of channel estimates determined from the second long symbol. The comparison uses a metric that in one embodiment, is the weighted sum of amplitude and phase deviations. Alternate embodiments may use other metrics. In the embodiment shown in FIG. 12, an error metric accumulator 1227 accepts the candidate smoothed channel estimates based on the first long symbol from the candidate smoothing filters 1225, and also accepts the channel estimates based on the second long symbol from the rectangular-to-polar coordinate converter 1215, and accumulates the metrics, e.g., using a set of accumulators, one for each candidate smoothing filter. The candidate smoothing filter from set 1225 that provides smoothed channel estimates "closest" to the set of channel estimated obtained using the second long symbol, i.e., the filter that produces the lowest metric, is selected by a minimum selector 1229 to be the smoothing filter to use. In one embodiment, the minimum selector 1229 compares the accumulated metric. The output of the minimum selector 1229 is a control signal for a selector 1231 that selects which of the outputs of the filters 1225 to use.

During the SIGNAL part of the packet, the control signal is such that the switch 1201 causes the factoring unit 1203 to be bypassed. The channel corrector accepts received signals (converted by coordinate converter 1215) for channel correction. The switch 1221 reads out the average channel response stored in the memory 1207. The output of switch 1231 is the smoothed average channel response, smoothed by the selected filter. The control signal is such that a switch 1223 causes the set of smoothed channel responses to be input, via switch 1223, to the channel corrector 115. The channel corrector uses this initial set of smoothed channel responses to correct the received signal for the channel.

The smoothed channel responses from switch unit 1231 also are converted to rectangular coordinates by a coordinate converter 1233, and scaled as appropriate by a scaler 1235 to form the next update to the stored channel response. The control signal 1213 causes the switch 1205 to input this next update to the stored channel response into the channel response RAM 1207.

For the remainder of the packet, the control signal is such that the channel corrector accepts stored channel estimates from the RAM 1207 (via coordinate converter 1217 and switch 1223), and corrects the received signal from the FFT 111 via switch 1201 and coordinate converter 1215. As each OFDM symbol is processed, each channel output from the FFT 111 is thus corrected by the channel corrector 115.

In update mode, the control signal 1213 into switch 1205 is such that the channel response RAM 1207 is updated by the updated set of channel estimates as each new symbol is processed.

In bypass mode, the control signal 1213 into switch 1205 is such that the channel response RAM 1207 is updated with its previous value.

In one embodiment, the control signal 1213 depends on the EVM of the SIGNAL field determined by a signal quality circuit in datapath 1051. In particular, the updating mode only occurs if EVM(SIGNAL) exceeds a settable threshold. Different thresholds are used for different types of modulation.

In the same manner as shown in FIG. 10, a complex multiplier 1027 accepts the output from a demodulator and inverse re-modulator 1023 and the pre-decision constellation point to form a measure of the relative channel drift. The embodiment shown includes, as in FIG. 10, a rounding unit 1025 and a FIFO buffer. Furthermore, the complex multiplier includes clipping and rounding the output, and scaling one or both inputs to produce the desired number of bits for the measure of the channel drift. The embodiment shown further includes a path as shown from the pilot correction unit 117 to the demodulator-inverse re-modulator 1023.

The relative measure of the channel drift is multiplied with the previous contents of the RAM 1207 (containing the previous stored function of the channel response) by a second complex multiplier 1029. Multiplier 1029 includes clipping and rounding the output, and scaling one or both of the inputs to produce the desired number of bits to match the scaling and number of bits in the RAM 1207. The multiplied output represents the function of the new estimate of the channel response. The functions of the new channel estimate and the functions of the previous channel estimates are now weighted by k1 and (1−k1), respectively by weighting unit 1031,1033, and the weighted quantities added by adder 1035 and scaled by scaler 1237. that scales, rounds, and clips as appropriate for writing into the RAM 1207.

This forms at point E the function of the updated channel estimate that is updated into the RAM 1207.

Delay buffers 1039, 1040, and 1041, like buffer 1043, are included and adjusted to ensure the signals are all synchronized and arrive at the respective locations at the correctly matched times.

Thus the RAM 1207 nominally contains the channel estimate for the subcarriers. Otherwise, during symbols subsequent to the SIGNAL field, a small proportion of the average as controlled by the parameter k1 is adapted according to the channel drift and returned to the RAM. In this way, the channel can be slowly tracked.

FIG. 12 includes a channel drift change detector 1237 that detects the rate of change of the channel drift from complex multiplier 1027. One aspect of the invention is that the relative weighting, k1, is a function of the detected change in channel drift. In one embodiment, the memory is updated only if the detected rate of change in channel drift exceeds a change threshold. In one implementation, this is achieved by making k1=0 unless the detected rate of change exceeds the threshold. In another implementation, the control signal 1213 is made dependent on the detected rate of change. The value of the control signal 1213 to switch 1205 is such that the contents of the memory 1207 are only updated if the detected rate of change exceeds the threshold.

In one embodiment, the change detector 1237 includes a loop filter 1243.

Many of the details of implementation are omitted herein. See the Parent Patent Application (incorporated-by-reference U.S. patent application Ser. No. 10/217,117n now U.S. Pat. No. 7,161,896) for such details. For example, the writing and reading of the memories occurs in particular orders. Furthermore, both serial and parallel architectures are possible for the initial determination of the function of the channel estimates. Furthermore, when smoothing is included, in some embodiments, not all of the subcarriers are smoothed.

In yet another embodiment, smoothing is also carried out of updates of the channel estimates. In one such embodiment, a smoothing filter is also used to smooth the updates that replace the function of the channel response stored in the memory. In another adaptive smoother embodiment, a second set of candidate smoothing filters and a selector are applied to the measure of channel drift. Once the best smoothing filter is selected, the selection signal is applied to the additional selector such that the smoothing is of the initial average estimate and of further updates thereof.

According to another embodiment, updating is only using the SIGNAL field. Thus, the function of the initial channel estimate is stored in the memory, and this is updated using data during the SIGNAL field. Once such updating using the signal field is carried out, no further updating occurs.

One embodiment includes a modification of the system shown in FIG. 12 as follows. A first set of rough channel estimates determined using the signal received corresponding to the first long symbol are stored in the RAM 1219. While the average of the set of rough channel estimates determined using the signal received corresponding to the first and the second long symbols are stored in the memory 1207, the first set of rough estimates is read out of memory 1219 and filtered by the candidate smoothing filters 1225. The filter outputs are fed to the metric error accumulator 1227 together with average set of rough channel estimates. At the end of the second long symbol, the peak min detector 1229 generates a signal to the selector to choose the best smoother. During reception of the subcarriers of received signals corresponding to the SIGNAL field, the SIGNAL field subcarriers are stored in the memory 1219, and also are channel corrected, demodulated, and decoded (datapath 1051). Once decoded, the data is re-coded and inverse re-modulated. As the next data field arrives, the stored subcarriers of corresponding to the SIGNAL field are read out of the memory 1219, smoothed and averaged with the so-far averaged smoothed channel estimates to update the channel estimates.

In another embodiment, each subcarrier of the known symbol is multiplied with the corresponding smoothed channel estimate and compared with the subcarriers determined from the second set of samples. Thus, the candidate smoothing filters (including no smoothing) are compared to see which predicts the part of the received signal corresponding to the second known symbol. In yet another alternate embodiment, each of the smoothed, averaged channel estimates is computed using each of the candidate smoothing filters, and the preferred smoothing filter selected after the second long symbol is completed.

In one embodiment, after the SIGNAL field is demodulated/decoded after channel correction using the channel estimates for the subcarriers, the decoded/demodulated information provides for obtaining an additional rough estimate of the channel of each subcarrier. In one embodiment, the DFT of the signals received corresponding to the SIGNAL field are corrected by factoring out the demodulated/decoded then re-encoded/re-modulated SIGNAL field subcarrier-by-subcarrier. This set of additional rough estimates is smoothed by the selected smoothing filter, and each smoothed additional rough channel estimate is averaged (as a weighted sum by a weighting unit) with the already obtained smoothed (and averaged) channel estimates to provide the channel estimate of each subcarrier to use with the remaining data fields in the packet.

While in one embodiment, the rough channel estimates determined from signals received as a result of the SIGNAL field are smoothed prior to averaging with the smoothed rough channel estimates determined by the long symbols, other embodiments may average the rough channel estimates determined from the SIGNAL field with the long-symbol determined smoothed rough estimates without smoothing the SIGNAL-determined rough channel estimates. Furthermore, in one embodiment, the averaging occurs after the three sets of rough (smoothed or not) channel estimates are determined, while in another embodiment, the SIGNAL-determined rough channel estimates are averaged with the averages of the long-symbol determined smoothed rough estimates.

Thus, in an alternate embodiment to that shown in FIG. 12, at the end of the second long symbol, a peak min detector generates a signal to a selector to choose the best smoother from a set of candidate smoothers (as occurs in FIG. 12). During reception of the subcarriers of received signals corresponding to the SIGNAL field, the SIGNAL field subcarriers are stored (this is different from the embodiment of FIG. 12), and also are channel corrected, demodulated, and decoded. Once decoded, the data is re-coded and re-modulated. As the next data field arrives, the stored subcarriers corresponding to the SIGNAL field are read out, smoothed and averaged with the so-far averaged smoothed channel estimates to update the channel estimates.

Note that if for re-coded decoded data, there is confidence in the demodulation and decoding of subsequent data, and thus the channel estimates are updated as more data arrives.

Thus several embodiments of a channel estimator and of a method for estimating the channels have been described.

Note that in the embodiments described above, the terms used for the quantities often do not include that there may be different scaling factors. Thus, as an example, when it is said in the description, claims, etc., that the memory stores for each subcarrier a product of the channel estimate and the known subcarrier of the known part, those in the art will understand the term "a product" to include any quantity that is proportional to such a product.

Note that while embodiments described above include a memory subsystem, it is understood that such a memory subsystem may be built as a single memory, or as more than one memory.

It should be appreciated that although the invention has been described in the context of the OFDM variants of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

While an embodiment has been described for operation in an OFDM receiver with RF frequencies in the 2 GHz range (802.11g) and 5 GHz range (802.11a), the invention may be embodied in receivers and transceivers operating in other RF frequency ranges.

The IEEE 802.11a and 802.11g standards use OFDM and a preamble with two identical known long symbols that provide for channel estimation. The invention may be used with any data that includes known transmitted symbols or transmitted signals that may be accurately determined at the receiver. For example, the invention may include any number of known symbols at known locations. The symbols need not be identical. Furthermore, the symbols may be known because of the packet structure, or may become known via decision-direction and/or decoded-decision direction.

Note that in the embodiments described above, the output of the Fourier transformer is in rectangular coordinates and is coupled to a rectangular-to-polar converter (a Cordic) prior to the processing chain so that the smoothing occurs in the amplitude and phase domain. In alternate embodiments, the output of the Fourier transformer is maintained in rectangular coordinates so that the smoothing occurs in the rectangular (e.g., I-Q) domain.

Note that while in the embodiment shown, the updates are carried out in the IQ domain, in an alternate embodiment, the calculations are carried out in polar (amplitude/phase) coordinates.

Note that in some of the embodiments described above, the weighting for the updating was according to one or another measure, e.g., according to the measure of signal quality. This includes the case that whether or not any updating occurs is whether or not the measure exceeds a settable threshold. While one version implements this by the weighting k1 itself being made 0, in the preferred embodiment, the memory subsystem is not updated, e.g., writing to the memory is disabled, or the memory is re-loaded with the same contents when the threshold is not exceeded. This too is within the meaning of the phrase "the weighting is according the measure."

Furthermore, while the invention has been described in the context of the Parent Patent Application (incorporated-by-reference U.S. patent application Ser. No. 10/217,117, now U.S. Pat. No. 7,161,896) using smoothing filters that are each describable as a weighted moving average filter (some filters have equal coefficients), other embodiments may use one or more other smoothing filters. Many types of smoothing filters are known in the art.

Embodiments have been described in which the rough channel estimates are stored, and the smoothing is then performed on the stored rough channel responses. In an alternate version, the smoothed rough channel responses determined from the first long symbol are stored. In some embodiments, the received carriers are stored prior to the factoring out of the known first long symbol, while in others, the storing is post-factoring. Thus, in general, a function of each of the channel estimates is kept in storage. Other variations are also possible. For example, the order of averaging and smoothing may be reversed, so that in one alternate embodiment, the received subcarriers' rough channel estimates may be averaged and then smoothed. In another, the received signals may be averaged, then converted to average rough channel estimates and then smoothed.

While one embodiment described in the Parent Patent Application (incorporated-by-reference U.S. patent application Ser. No. 10/217,117, now U.S. Pat. No. 7,161,896) uses a parallel-in, parallel out register to implement the smoothing filter, an alternate embodiment uses a serial in, parallel out shift register.

Note that while the embodiments shown herein use for forward discrete Fourier transform implemented as an FFT, those on the art will recognize that the DFT/FFT, IDFT/IFFT may be considered to be identical.

One embodiment of each of the methods described herein is in the form of a computer program that executes on a processing system, e.g., one or more processors that are part of an OFDM wireless receiver. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate technique for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

In the claims below and the description herein, the term "comprising" or "comprised of" or "which comprises" is an "open" term that means including at least the elements/features that follow, but not excluding others. The term "including" or "which includes" or "that includes" as used herein is also an "open" term that also means including at least the elements/features that follow the term, but not excluding others. Thus, including is synonymous with and means comprising.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus comprising:
    a receiver configured to wirelessly receive a packet of information that includes a known transmitted part and to digitize the received signal, the known transmitted part having subcarriers with known values;
    a signal-to-tone transformer to determine the modulated subcarriers of a received signal corresponding to the received packet;
    a channel storage unit coupled to the signal-to-tone transformer including:
        an initial channel calculator to calculate a function of the initial channel response of subcarriers from the known part of the received packet;
        a memory subsystem configured to at a first time store a function of an initial channel response corresponding to the known part of the received packet, and at later times to store additionally or instead updates to or of previous version or versions of the channel response;
    a channel corrector coupled to the channel storage unit and to the signal-to-tone transformer configured to correct the modulated subcarriers of the received signal for the respective channel using the contents of the memory subsystem; the channel corrector configured to form channel corrected constellation values for the received signal;
    a decision and channel drift circuit coupled to the channel corrector to form post-decision constellation values corresponding to the channel corrected constellation values and to form a measure of the channel drift from the post decision constellation values and the pre-decision constellation values; and
    an updating circuit coupled to the channel storage unit to update the memory subsystem with an updated value determined from previous contents of the memory subsystem and an update, the update determined from the memory subsystem contents and the measure of the channel drift between symbols,
    such that drift of the channel response is tracked.

2. An apparatus as recited in claim 1, wherein the updating circuit includes a weighting and summing circuit coupled to the memory subsystem to update the memory subsystem with a weighted sum of the pre-update function in the memory subsystem and an update, the update determined from the pre-update function and the measure of the channel drift between symbols, such that the memory subsystem contents track channel drift from symbol to symbol, the tracking according to the relative weightings of the weighted sum.

3. An apparatus as recited in claim 1, wherein the function of the initial channel response initially stored in the memory subsystem for a subcarrier is the initial channel response for the subcarrier multiplied by the known value of the subcarrier for the known transmitted part, and wherein the apparatus is also configured to factor out the known transmitted part prior to or concurrent with the correcting for the respective channel.

4. An apparatus as recited in claim 1, wherein the function of the channel response stored in the memory subsystem for a subcarrier is post factoring by the known value of the subcarrier for the known part, such that a factoring of the known part is included prior to the input from the signal-to-tone transformer to the memory subsystem.

5. An apparatus as recited in claim 1, wherein the signal-to-tone transformer produces subcarriers in rectangular coordinates, and the memory subsystem stores the function of the channel response in rectangular coordinates, OR
    wherein the signal-to-tone transformer produces subcarriers in rectangular coordinates, and wherein the memory subsystem stores the function of the channel response in polar coordinates.

6. An apparatus as recited in claim 1, wherein the decision circuit forms a hard decision.

7. An apparatus as recited in claim 1, wherein the decision circuit produces re-encoded decoded decisions.

8. An apparatus as recited in claim 1, wherein the subcarriers of the packet include pilot tones, the apparatus further comprising a pilot correction circuit between the channel corrector and the decision and channel drift circuit, the pilot correction circuit to correct for one or both of channel drift and timing errors.

9. An apparatus as recited in claim 1, further comprising a circuit configured to determine a measure of the signal quality of a predetermines part of a packet received by the receiver, and wherein the updating by the update takes into account the measure of the error vector magnitude.

10. An apparatus as recited in claim 1, further comprising a circuit configured to determine a measure of the error vector magnitude of a predetermines part of a packet received by the receiver,
wherein the updating by the update takes into account the measure of the error vector magnitude.

11. An apparatus as recited in claim 1, wherein the known part of the packet includes a first known part of at least one known symbol and a second known part of at least one known symbol, and wherein the initial channel calculator initially stores a function of the channel response based on received signals corresponding to the first part, and wherein initial channel calculator and memory are arranged to average the functions of the channel responses corresponding to the first and second parts, such that after the signals corresponding to the second known part are received, the function of the initial channel response in the memory is the average of the functions of the channel responses corresponding to the first and second parts.

12. An apparatus as recited in claim 11, wherein the function of the channel response stored in the memory subsystem for a subcarrier is post factoring by the known value of the subcarrier for the known symbol, the apparatus further comprising a factoring unit between the signal-to-tone transformer and the memory subsystem to factor by the known subcarrier value.

13. An apparatus as recited in claim 12, further comprising a channel smoother coupled to the memory to smooth the channel responses to take into account correlation between channel responses of adjacent subcarriers, the apparatus further including a factoring circuit to factor out the known subcarriers values of the known part.

14. An apparatus as recited in claim 11, further comprising a channel drift change detector coupled to the channel drift circuit to detect the change in channel drift, such that the relative weighting is a function of the detected change in channel drift.

15. An apparatus as recited in claim 14, wherein the memory is updated only if the detected change in channel drift exceeds a change threshold.

16. A method of operating an apparatus comprising a wireless receiver and a signal-to-tone transformer, the method comprising:
the wireless receiver wirelessly receiving a signal corresponding to a packet of information, the packet being an OFDM packet that includes a known transmitted part having subcarriers with known values;
transforming the received signal corresponding to the packet using the signal-to-tone transformer carrying out a signal-to-tone transformation to determining the subcarriers of the received signal corresponding to the packet;
calculating a function of a channel response of subcarriers from the known part of the packet;
storing the function of the channel response;
channel correcting the modulated subcarriers of the received signal for the channel using the stored initial or updated function of the channel response to form channel-corrected constellation values for the received signal;
forming post-decision values corresponding to the channel corrected constellation values; and
forming a measure of the channel drift from the post decision values and the channel-corrected constellation values,
wherein initially the function of an initial value of the channel response is stored and, as more packets are received, updates to the function or updated values of the function of the channel response are stores, the difference between a pre-update stored function of the channel response and updated values of the function of the channel response being dependent on the pre-update stored function of the channel response and on the measure of the channel drift between symbols,
such that the stored function of the channel response tracks the drift of the channel response as more packets are received.

17. A method as recited in claim 16, further comprising forming a weighted sum of the pre-update stored function of the channel response and an update, the update determined from the pre-update stored function of the channel response and the measure of the channel drift between symbols.

18. A method as recited in claim 16, wherein the forming the post-decision values forms hard demodulated decisions.

19. A method as recited in claim 16, wherein the forming the decision produces re-encoded decoded decisions.

20. An apparatus comprising:
means for wirelessly receiving a signal corresponding to a packet of information, the packet being an OFDM packet that includes a known transmitted part having subcarriers with known values;
means for signal-to-tone transforming the received packet to determining the subcarriers of a signal corresponding to the received packet;
means for calculating a function of a channel response of subcarriers from the known part of the received packet;
means for storing configured to store the function of the channel response;
means for channel correcting the modulated subcarriers of the received signal for the channel using the stored initial or updated function of the channel response to form channel-corrected constellation values for the received signal;
means for forming a decision to determine post-decision values corresponding to the channel corrected constellation values; and
means for forming a measure of the channel drift from the post decision values and the channel-corrected constellation values,
wherein initially the function of an initial value of the channel response is stored and, as more packets are received, updates to the function or updated values of the function of the channel response are stores, the difference between a pre-update stored function of the channel response and updated values of the function of the channel response being dependent on the pre-update stored function of the channel response and on the measure of the channel drift between symbols,
such that the stored function of the channel response tracks the drift of the channel response as more packets are received.

* * * * *